US009092132B2

(12) United States Patent
Migos et al.

(10) Patent No.: US 9,092,132 B2
(45) Date of Patent: Jul. 28, 2015

(54) DEVICE, METHOD, AND GRAPHICAL USER INTERFACE WITH A DYNAMIC GESTURE DISAMBIGUATION THRESHOLD

(75) Inventors: Charles J. Migos, San Bruno, CA (US); Britt S. Miura, Menlo Park, CA (US); Akiva D. Leffert, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 1054 days.

(21) Appl. No.: 13/077,711

(22) Filed: Mar. 31, 2011

(65) Prior Publication Data
US 2012/0192117 A1    Jul. 26, 2012

Related U.S. Application Data

(60) Provisional application No. 61/435,779, filed on Jan. 24, 2011.

(51) Int. Cl.
*G06F 3/033* (2013.01)
*G06F 3/041* (2006.01)
*G06F 3/0488* (2013.01)
*G06F 17/24* (2006.01)

(52) U.S. Cl.
CPC .......... *G06F 3/04883* (2013.01); *G06F 17/241* (2013.01)

(58) Field of Classification Search
CPC ..... G06F 3/04883; G06F 3/017; G06F 3/016; G06F 3/0488; G06F 3/0236; G06F 17/241
USPC ................. 715/863, 702, 773, 273, 234, 833; 345/173
See application file for complete search history.

(56) References Cited

U.S. PATENT DOCUMENTS

| 2,794,861 A | 6/1957 | Heine |
| 4,081,631 A | 3/1978 | Feder |

(Continued)

FOREIGN PATENT DOCUMENTS

| EP | 1 536 316 A1 | 6/2005 |
| EP | 1 703 363 A2 | 9/2006 |

(Continued)

OTHER PUBLICATIONS

Blind Type, "Touch typing the way it should be," 2010, 2 pages.

(Continued)

*Primary Examiner* — Rashawn Tillery
(74) *Attorney, Agent, or Firm* — Morrison & Foerster LLP

(57) ABSTRACT

An electronic device with a display, a touch-sensitive surface, one or more processors, and memory detects a first portion of a gesture, and determines that the first portion has a first gesture characteristic. The device selects a dynamic disambiguation threshold in accordance with the first gesture characteristic. The dynamic disambiguation threshold is used to determine whether to perform a first type of operation or a second type of operation when a first kind of gesture is detected. The device determines that the gesture is of the first kind of gesture. After selecting the dynamic disambiguation threshold, the device determines whether the gesture meets the dynamic disambiguation threshold. When the gesture meets the dynamic disambiguation threshold, the device performs the first type of operation, and when the gesture does not meet the dynamic disambiguation threshold, the device performs the second type of operation.

25 Claims, 17 Drawing Sheets

(56) References Cited

U.S. PATENT DOCUMENTS

| | | |
|---|---|---|
| 4,107,784 A | 8/1978 | Van Bemmelen |
| 4,202,041 A | 5/1980 | Kaplow et al. |
| 4,204,089 A | 5/1980 | Key et al. |
| 4,313,108 A | 1/1982 | Yoshida |
| 4,332,464 A | 6/1982 | Bartulis et al. |
| 4,334,219 A | 6/1982 | Paulus et al. |
| 4,353,056 A | 10/1982 | Tsikos |
| 4,433,377 A | 2/1984 | Eustis et al. |
| 4,455,452 A | 6/1984 | Schuyler |
| 4,459,581 A | 7/1984 | Wilson et al. |
| 4,485,439 A | 11/1984 | Rothstein |
| 4,504,133 A | 3/1985 | Nakai et al. |
| 4,513,379 A | 4/1985 | Wilson et al. |
| 4,555,775 A | 11/1985 | Pike |
| 4,586,158 A | 4/1986 | Brandle |
| 4,598,363 A | 7/1986 | Clark et al. |
| 4,642,790 A | 2/1987 | Minshull |
| 4,658,425 A | 4/1987 | Julstrom |
| 4,680,429 A | 7/1987 | Murdock et al. |
| 4,698,625 A | 10/1987 | McCaskill et al. |
| 4,746,770 A | 5/1988 | McAvinney |
| 4,755,811 A | 7/1988 | Slavin et al. |
| 4,790,028 A | 12/1988 | Ramage |
| 4,803,463 A | 2/1989 | Sado |
| 4,812,831 A | 3/1989 | Laier |
| 5,347,295 A | 9/1994 | Agulnick et al. |
| 5,465,084 A | 11/1995 | Cottrell |
| 5,559,961 A | 9/1996 | Blonder |
| 5,677,710 A | 10/1997 | Thompson-Rohrlich |
| 5,729,219 A | 3/1998 | Armstrong et al. |
| 5,821,933 A | 10/1998 | Keller et al. |
| 5,905,497 A | 5/1999 | Vaughan et al. |
| 5,907,327 A | 5/1999 | Ogura et al. |
| 6,037,937 A | 3/2000 | Beaton et al. |
| 6,151,208 A | 11/2000 | Bartlett |
| 6,154,758 A | 11/2000 | Chiang |
| 6,160,555 A | 12/2000 | Kang et al. |
| 6,192,478 B1 | 2/2001 | Elledge |
| 6,249,606 B1 | 6/2001 | Kiraly et al. |
| 6,307,549 B1 | 10/2001 | King et al. |
| 6,323,846 B1 | 11/2001 | Westerman et al. |
| 6,347,290 B1 | 2/2002 | Bartlett |
| 6,421,453 B1 | 7/2002 | Kanevsky et al. |
| 6,424,711 B1 | 7/2002 | Bayless et al. |
| 6,486,895 B1 | 11/2002 | Robertson et al. |
| 6,570,557 B1 | 5/2003 | Westerman et al. |
| 6,573,883 B1 | 6/2003 | Bartlett |
| 6,633,310 B1 | 10/2003 | Andrew et al. |
| 6,657,560 B1 | 12/2003 | Jung |
| 6,677,932 B1 | 1/2004 | Westerman |
| 6,720,860 B1 | 4/2004 | Narayanaswami |
| 6,735,695 B1 | 5/2004 | Gopalakrishnan et al. |
| 6,842,182 B2 | 1/2005 | Ungar et al. |
| 6,924,822 B2 | 8/2005 | Card et al. |
| 6,944,818 B2 | 9/2005 | Newman et al. |
| 6,947,062 B2 | 9/2005 | Cuijpers et al. |
| 6,995,746 B2 | 2/2006 | Aymeric |
| 7,088,342 B2 | 8/2006 | Rekimoto et al. |
| 7,124,433 B2 | 10/2006 | Little |
| 7,151,843 B2 | 12/2006 | Rui et al. |
| 7,174,462 B2 | 2/2007 | Pering et al. |
| 7,176,888 B2 | 2/2007 | Marvit et al. |
| 7,185,274 B1 | 2/2007 | Rubin et al. |
| 7,190,349 B2 | 3/2007 | Kim et al. |
| 7,236,576 B2 | 6/2007 | Schnarel et al. |
| 7,263,670 B2 | 8/2007 | Rekimoto |
| 7,286,063 B2 | 10/2007 | Gauthey et al. |
| 7,299,424 B2 | 11/2007 | Jarrett et al. |
| 7,383,517 B2 | 6/2008 | Baudisch et al. |
| 7,395,506 B2 | 7/2008 | Tan et al. |
| 7,434,177 B1 | 10/2008 | Ording et al. |
| 7,437,683 B1 | 10/2008 | Beezer et al. |
| 7,477,231 B2 | 1/2009 | Asai |
| 7,480,870 B2 | 1/2009 | Anzures et al. |
| 7,602,378 B2 | 10/2009 | Kocienda et al. |
| 7,614,008 B2 | 11/2009 | Ording |
| 7,627,904 B2 | 12/2009 | Tokkonen |
| 7,634,263 B2 | 12/2009 | Louch et al. |
| 7,768,501 B1 | 8/2010 | Maddalozzo, Jr. et al. |
| 7,810,105 B2 | 10/2010 | Prabandham et al. |
| 8,006,299 B2 | 8/2011 | Suominen |
| 8,033,744 B2 | 10/2011 | Baker |
| 8,095,879 B2 | 1/2012 | Goertz |
| 8,289,162 B2 | 10/2012 | Mooring et al. |
| 8,347,232 B1 * | 1/2013 | Prud'Hommeaux et al. . 715/833 |
| 8,352,745 B2 | 1/2013 | Mckeeth |
| 8,358,321 B1 | 1/2013 | Weidner |
| 8,365,059 B2 | 1/2013 | Walsh et al. |
| 8,368,658 B2 | 2/2013 | Brisebois et al. |
| 8,405,630 B1 | 3/2013 | Bi et al. |
| 8,448,083 B1 | 5/2013 | Migos et al. |
| 8,520,025 B2 | 8/2013 | Patterson et al. |
| 8,850,350 B2 | 9/2014 | Bi et al. |
| 2001/0012022 A1 | 8/2001 | Smith |
| 2002/0015024 A1 | 2/2002 | Westerman et al. |
| 2002/0015064 A1 | 2/2002 | Robotham et al. |
| 2002/0028018 A1 | 3/2002 | Hawkins et al. |
| 2002/0105504 A1 | 8/2002 | Toepke et al. |
| 2002/0118175 A1 | 8/2002 | Liebenow et al. |
| 2002/0191029 A1 | 12/2002 | Gillespie et al. |
| 2002/0196274 A1 | 12/2002 | Comfort et al. |
| 2003/0001899 A1 | 1/2003 | Partanen et al. |
| 2003/0142138 A1 | 7/2003 | Brown et al. |
| 2003/0184528 A1 | 10/2003 | Kawasaki et al. |
| 2003/0206202 A1 | 11/2003 | Moriya |
| 2003/0210272 A1 | 11/2003 | D'Souza |
| 2003/0222913 A1 | 12/2003 | Mattila et al. |
| 2004/0021691 A1 | 2/2004 | Dostie et al. |
| 2004/0030934 A1 | 2/2004 | Mizoguchi et al. |
| 2004/0034801 A1 | 2/2004 | Jaeger |
| 2004/0068409 A1 | 4/2004 | Tanaka |
| 2004/0080487 A1 | 4/2004 | Griffin et al. |
| 2004/0085351 A1 | 5/2004 | Tokkonen |
| 2004/0088564 A1 | 5/2004 | Norman |
| 2004/0088568 A1 | 5/2004 | Tokkonen |
| 2004/0100479 A1 | 5/2004 | Nakano et al. |
| 2004/0113819 A1 | 6/2004 | Gauthey |
| 2004/0119750 A1 | 6/2004 | Harrison |
| 2004/0140984 A1 | 7/2004 | Hinckley et al. |
| 2004/0183834 A1 | 9/2004 | Chermesino |
| 2004/0201576 A1 | 10/2004 | Shimada et al. |
| 2004/0230843 A1 | 11/2004 | Jansen |
| 2004/0230912 A1 | 11/2004 | Clow et al. |
| 2004/0250138 A1 | 12/2004 | Schneider |
| 2004/0260955 A1 | 12/2004 | Mantyla |
| 2004/0268267 A1 | 12/2004 | Moravcsik |
| 2005/0050477 A1 | 3/2005 | Robertson et al. |
| 2005/0060554 A1 | 3/2005 | O'Donoghue |
| 2005/0079896 A1 | 4/2005 | Kokko et al. |
| 2005/0154798 A1 | 7/2005 | Nurmi |
| 2005/0164798 A1 | 7/2005 | Rayburn |
| 2005/0212760 A1 | 9/2005 | Marvit et al. |
| 2005/0216862 A1 | 9/2005 | Shinohara et al. |
| 2005/0216867 A1 | 9/2005 | Marvit et al. |
| 2005/0225538 A1 | 10/2005 | Verhaegh |
| 2005/0248525 A1 | 11/2005 | Asai |
| 2005/0248542 A1 | 11/2005 | Sawanobori |
| 2005/0253817 A1 | 11/2005 | Rytivaara et al. |
| 2005/0264833 A1 | 12/2005 | Hiraoka et al. |
| 2005/0289476 A1 | 12/2005 | Tokkonen |
| 2006/0007178 A1 | 1/2006 | Davis |
| 2006/0031776 A1 | 2/2006 | Glein et al. |
| 2006/0033724 A1 | 2/2006 | Chaudhri et al. |
| 2006/0038796 A1 * | 2/2006 | Hinckley et al. ............. 345/173 |
| 2006/0048072 A1 | 3/2006 | Jarrett et al. |
| 2006/0055685 A1 | 3/2006 | Rimas-Ribikauskas et al. |
| 2006/0061542 A1 | 3/2006 | Stokie |
| 2006/0080621 A1 | 4/2006 | Park |
| 2006/0085757 A1 | 4/2006 | Andre et al. |
| 2006/0136087 A1 | 6/2006 | Higashiura |
| 2006/0150087 A1 | 7/2006 | Cronenberger et al. |
| 2006/0152389 A1 | 7/2006 | Kajikawa |
| 2006/0161870 A1 | 7/2006 | Hotelling et al. |
| 2006/0164399 A1 | 7/2006 | Cheston et al. |

(56) References Cited

U.S. PATENT DOCUMENTS

| | | |
|---|---|---|
| 2006/0174339 A1 | 8/2006 | Tao |
| 2006/0181518 A1 | 8/2006 | Shen |
| 2006/0197750 A1 | 9/2006 | Kerr |
| 2006/0242607 A1 | 10/2006 | Hudson |
| 2006/0265648 A1 | 11/2006 | Rainisto et al. |
| 2006/0267955 A1 | 11/2006 | Hino |
| 2007/0060228 A1 | 3/2007 | Akasaka |
| 2007/0091070 A1 | 4/2007 | Larsen et al. |
| 2007/0097085 A1 | 5/2007 | Iwatsuki |
| 2007/0150826 A1 | 6/2007 | Anzures et al. |
| 2007/0150842 A1 | 6/2007 | Chaudhri et al. |
| 2007/0171210 A1 | 7/2007 | Chaudhri et al. |
| 2007/0273662 A1 | 11/2007 | Lian et al. |
| 2007/0277126 A1 | 11/2007 | Park et al. |
| 2007/0300140 A1 | 12/2007 | Makela et al. |
| 2008/0034292 A1 | 2/2008 | Brunner et al. |
| 2008/0034307 A1 | 2/2008 | Cisler et al. |
| 2008/0036743 A1 | 2/2008 | Westerman et al. |
| 2008/0042978 A1 | 2/2008 | Perez-Noguera |
| 2008/0055263 A1 | 3/2008 | Lemay et al. |
| 2008/0055269 A1 | 3/2008 | Lemay et al. |
| 2008/0072172 A1 | 3/2008 | Shinohara et al. |
| 2008/0082920 A1 | 4/2008 | Eom |
| 2008/0082934 A1 | 4/2008 | Kocienda et al. |
| 2008/0094371 A1 | 4/2008 | Forstall et al. |
| 2008/0115078 A1 | 5/2008 | Girgaonkar |
| 2008/0122796 A1 | 5/2008 | Jobs et al. |
| 2008/0134101 A1* | 6/2008 | Newman ...................... 715/856 |
| 2008/0134170 A1 | 6/2008 | Astheimer |
| 2008/0141126 A1 | 6/2008 | Johnson et al. |
| 2008/0158024 A1 | 7/2008 | Steiner et al. |
| 2008/0165141 A1 | 7/2008 | Christie |
| 2008/0165144 A1 | 7/2008 | Forstall et al. |
| 2008/0168290 A1 | 7/2008 | Jobs et al. |
| 2008/0180408 A1 | 7/2008 | Forstall et al. |
| 2008/0259057 A1 | 10/2008 | Brons |
| 2008/0297377 A1 | 12/2008 | Wang et al. |
| 2009/0005165 A1 | 1/2009 | Arezina et al. |
| 2009/0006991 A1 | 1/2009 | Lindberg et al. |
| 2009/0052778 A1 | 2/2009 | Edgecomb et al. |
| 2009/0058815 A1 | 3/2009 | Jeon et al. |
| 2009/0058820 A1 | 3/2009 | Hinckley |
| 2009/0058823 A1 | 3/2009 | Kocienda |
| 2009/0064047 A1 | 3/2009 | Shim et al. |
| 2009/0091541 A1 | 4/2009 | Chen |
| 2009/0122018 A1 | 5/2009 | Vymenets et al. |
| 2009/0128581 A1 | 5/2009 | Brid et al. |
| 2009/0132957 A1 | 5/2009 | Reddy |
| 2009/0140986 A1 | 6/2009 | Karkkainen et al. |
| 2009/0153288 A1* | 6/2009 | Hope et al. .................. 340/3.1 |
| 2009/0167706 A1 | 7/2009 | Tan et al. |
| 2009/0174669 A1 | 7/2009 | Shkolnikov |
| 2009/0174679 A1 | 7/2009 | Westerman |
| 2009/0189858 A1 | 7/2009 | Lev et al. |
| 2009/0195959 A1 | 8/2009 | Ladouceur et al. |
| 2009/0213081 A1 | 8/2009 | Case, Jr. |
| 2009/0215497 A1 | 8/2009 | Louch |
| 2009/0225035 A1 | 9/2009 | Baik |
| 2009/0225041 A1 | 9/2009 | Kida et al. |
| 2009/0228842 A1 | 9/2009 | Westerman et al. |
| 2009/0231281 A1 | 9/2009 | Whytock et al. |
| 2009/0235281 A1 | 9/2009 | Lu et al. |
| 2009/0237359 A1 | 9/2009 | Kim et al. |
| 2009/0237361 A1 | 9/2009 | Mosby et al. |
| 2009/0241054 A1 | 9/2009 | Hendricks |
| 2009/0241072 A1 | 9/2009 | Chaudhri et al. |
| 2009/0243898 A1 | 10/2009 | Iorfida et al. |
| 2009/0244020 A1 | 10/2009 | Sjolin |
| 2009/0247233 A1 | 10/2009 | Kim |
| 2009/0251422 A1 | 10/2009 | Wu et al. |
| 2009/0256817 A1 | 10/2009 | Perlin et al. |
| 2009/0258677 A1 | 10/2009 | Ellis et al. |
| 2009/0265627 A1 | 10/2009 | Kim et al. |
| 2009/0267906 A1 | 10/2009 | Schroderus |
| 2009/0273566 A1 | 11/2009 | Lu et al. |
| 2009/0284482 A1 | 11/2009 | Chin |
| 2009/0303200 A1 | 12/2009 | Grad |
| 2009/0309768 A1 | 12/2009 | Pihlaja |
| 2009/0328162 A1 | 12/2009 | Kokumai et al. |
| 2010/0004029 A1 | 1/2010 | Kim |
| 2010/0020033 A1 | 1/2010 | Nwosu |
| 2010/0020034 A1 | 1/2010 | Kim |
| 2010/0058212 A1 | 3/2010 | Belitz et al. |
| 2010/0064261 A1 | 3/2010 | Andrews et al. |
| 2010/0070613 A1 | 3/2010 | Chen et al. |
| 2010/0079380 A1 | 4/2010 | Nurmi |
| 2010/0088641 A1 | 4/2010 | Choi |
| 2010/0103124 A1 | 4/2010 | Kruzeniski et al. |
| 2010/0105408 A1 | 4/2010 | Palmer et al. |
| 2010/0107050 A1 | 4/2010 | Wang et al. |
| 2010/0110017 A1 | 5/2010 | Lee |
| 2010/0141590 A1 | 6/2010 | Markiewicz et al. |
| 2010/0146459 A1 | 6/2010 | Repka |
| 2010/0153313 A1 | 6/2010 | Baldwin et al. |
| 2010/0156793 A1 | 6/2010 | Ozias et al. |
| 2010/0162180 A1 | 6/2010 | Dunnam et al. |
| 2010/0164684 A1 | 7/2010 | Sasa et al. |
| 2010/0164959 A1 | 7/2010 | Brown et al. |
| 2010/0185949 A1 | 7/2010 | Jaeger |
| 2010/0194692 A1 | 8/2010 | Orr et al. |
| 2010/0214237 A1 | 8/2010 | Echeverri et al. |
| 2010/0231612 A1 | 9/2010 | Chaudhri et al. |
| 2010/0235726 A1* | 9/2010 | Ording et al. .................. 715/234 |
| 2010/0235732 A1 | 9/2010 | Bergman |
| 2010/0235794 A1 | 9/2010 | Ording |
| 2010/0238125 A1 | 9/2010 | Ronkainen |
| 2010/0238139 A1 | 9/2010 | Goertz et al. |
| 2010/0241985 A1 | 9/2010 | Kim et al. |
| 2010/0259484 A1 | 10/2010 | Jo |
| 2010/0259493 A1 | 10/2010 | Chang et al. |
| 2010/0259561 A1 | 10/2010 | Forutanpour et al. |
| 2010/0259562 A1 | 10/2010 | Miyazawa et al. |
| 2010/0277414 A1 | 11/2010 | Tartz et al. |
| 2010/0283743 A1 | 11/2010 | Coddington |
| 2010/0289756 A1 | 11/2010 | Anzures et al. |
| 2010/0293498 A1 | 11/2010 | Maxfield |
| 2010/0295781 A1 | 11/2010 | Alameh et al. |
| 2010/0299597 A1 | 11/2010 | Shin et al. |
| 2010/0302155 A1 | 12/2010 | Sands et al. |
| 2010/0306718 A1 | 12/2010 | Shim et al. |
| 2010/0315359 A1 | 12/2010 | Seong et al. |
| 2011/0006996 A1 | 1/2011 | Smith et al. |
| 2011/0007009 A1 | 1/2011 | Ishihara et al. |
| 2011/0009169 A1 | 1/2011 | Kim |
| 2011/0010672 A1 | 1/2011 | Hope |
| 2011/0029918 A1 | 2/2011 | Yoo et al. |
| 2011/0039602 A1 | 2/2011 | McNamara et al. |
| 2011/0050607 A1 | 3/2011 | Park |
| 2011/0055753 A1 | 3/2011 | Horodezky et al. |
| 2011/0074699 A1 | 3/2011 | Marr et al. |
| 2011/0078560 A1 | 3/2011 | Weeldreyer et al. |
| 2011/0078614 A1 | 3/2011 | Lee et al. |
| 2011/0106439 A1 | 5/2011 | Huang et al. |
| 2011/0179387 A1 | 7/2011 | Shaffer et al. |
| 2011/0187647 A1 | 8/2011 | Woloszynski et al. |
| 2011/0191718 A1 | 8/2011 | Hinckley et al. |
| 2011/0191719 A1 | 8/2011 | Hinckley et al. |
| 2011/0199393 A1 | 8/2011 | Nurse et al. |
| 2011/0221684 A1 | 9/2011 | Rydenhag |
| 2011/0231796 A1 | 9/2011 | Vigil |
| 2011/0242138 A1 | 10/2011 | Tribble |
| 2011/0258537 A1 | 10/2011 | Rives et al. |
| 2011/0263298 A1 | 10/2011 | Park |
| 2011/0283241 A1 | 11/2011 | Miller et al. |
| 2011/0302532 A1 | 12/2011 | Missig |
| 2012/0009896 A1 | 1/2012 | Bandyopadhyay et al. |
| 2012/0021724 A1 | 1/2012 | Olsen et al. |
| 2012/0023458 A1 | 1/2012 | Chaudhri et al. |
| 2012/0046947 A1 | 2/2012 | Fleizach |
| 2012/0096345 A1 | 4/2012 | Ho et al. |
| 2012/0110431 A1* | 5/2012 | Rosenfeld et al. ............. 715/230 |
| 2012/0112024 A1 | 5/2012 | Gotzl |
| 2012/0112025 A1 | 5/2012 | Smeenk |
| 2012/0112026 A1 | 5/2012 | Crawford |

(56) References Cited

U.S. PATENT DOCUMENTS

| | | |
|---|---|---|
| 2012/0113007 A1 | 5/2012 | Koch et al. |
| 2012/0113023 A1 | 5/2012 | Koch et al. |
| 2012/0113024 A1 | 5/2012 | Koch et al. |
| 2012/0113025 A1 | 5/2012 | Koch et al. |
| 2012/0113026 A1 | 5/2012 | Koch |
| 2012/0113126 A1 | 5/2012 | Koch et al. |
| 2012/0117501 A1 | 5/2012 | Koch et al. |
| 2012/0117505 A1 | 5/2012 | Koch et al. |
| 2012/0117506 A1 | 5/2012 | Koch et al. |
| 2012/0120016 A1 | 5/2012 | Mittal et al. |
| 2012/0127206 A1 | 5/2012 | Thompson et al. |
| 2012/0139844 A1 | 6/2012 | Ramstein et al. |
| 2012/0162078 A1 | 6/2012 | Ferren et al. |
| 2012/0182226 A1 | 7/2012 | Tuli |
| 2012/0188174 A1 | 7/2012 | Migos et al. |
| 2012/0188206 A1 | 7/2012 | Sparf et al. |
| 2012/0192093 A1 | 7/2012 | Migos et al. |
| 2012/0206363 A1 | 8/2012 | Kyprianou et al. |
| 2012/0206370 A1 | 8/2012 | Ivanovic |
| 2012/0324381 A1 | 12/2012 | Cohen et al. |
| 2013/0016129 A1 | 1/2013 | Gossweiler, III et al. |
| 2013/0057475 A1 | 3/2013 | Duggan et al. |
| 2013/0067382 A1 | 3/2013 | Townsend et al. |
| 2013/0167013 A1 | 6/2013 | Poliak |
| 2013/0222244 A1 | 8/2013 | Mak et al. |
| 2013/0234949 A1 | 9/2013 | Chornenky |
| 2013/0265225 A1 | 10/2013 | Nasiri et al. |
| 2013/0286435 A1 | 10/2013 | Anezaki et al. |
| 2014/0040835 A1 | 2/2014 | Hildreth et al. |
| 2014/0223381 A1 | 8/2014 | Huang et al. |

FOREIGN PATENT DOCUMENTS

| | | |
|---|---|---|
| EP | 1791051 A1 | 5/2007 |
| EP | 2 105 823 A1 | 9/2009 |
| EP | 2 109 031 A2 | 10/2009 |
| EP | 2 133 778 A2 | 12/2009 |
| EP | 2 341 414 A1 | 7/2011 |
| GB | 2 402 105 A | 12/2004 |
| JP | 2002-508559 A | 3/2002 |
| JP | 2005 244301 | 9/2005 |
| JP | 2005-526303 A | 9/2005 |
| JP | 2005-531861 A | 10/2005 |
| JP | 2006-139397 A | 6/2006 |
| JP | 2007 279638 | 10/2007 |
| JP | 2009-527041 A | 7/2009 |
| KR | 10-2005-0016691 A | 2/2005 |
| KR | 10-2009-0101741 A | 9/2009 |
| KR | 10-0975168 B1 | 8/2010 |
| WO | 99/31571 A1 | 6/1999 |
| WO | 00/68771 A1 | 11/2000 |
| WO | WO 00/74240 A1 | 12/2000 |
| WO | WO 02/15211 A1 | 2/2002 |
| WO | 03/36795 A1 | 5/2003 |
| WO | WO 03/062978 A2 | 7/2003 |
| WO | WO 2004/006080 A2 | 1/2004 |
| WO | WO 2005/033856 A2 | 4/2005 |
| WO | WO 2005/076477 A1 | 8/2005 |
| WO | WO 2007/014064 A2 | 2/2007 |
| WO | 2007/093984 A2 | 8/2007 |
| WO | WO 2007/089766 A2 | 8/2007 |
| WO | WO 2009/049331 A2 | 4/2009 |
| WO | 2009/084147 A1 | 7/2009 |
| WO | WO 2010/018579 A2 | 2/2010 |
| WO | WO 2010/089740 A1 | 8/2010 |
| WO | 2010/117374 A1 | 10/2010 |
| WO | WO 2011/123099 A1 | 10/2011 |
| WO | WO 2012/083499 A1 | 6/2012 |

OTHER PUBLICATIONS

Concept Phones, "Apple Tablet," Concept Phones.com, Dec. 16, 2009. http://www.concept-phones.com/?s=apple+tablet, 21 pages.

G.P. Imports, "Keyboard Upgrade," G.P. Imports, Inc., updated May 20, 2010, 8 pages.

Gizmodo, "How Will We Type on the Apple Tablet?", Gizmodo.com, Jan. 12, 2010, http://gizmodo.com/5446652/how-will-we-type-on-the-apple-tablet, 5 pages.

Robbin, S., "Concept: iPad Split Keyboard," Jan. 27, 2010, http://srobbin.com/blog/concept-ipad-split-keyboard/, 3 pages.

Surur, "Microsoft patents cool multi-touch virtual keyboard," wmpoweruser.com, Sep. 25, 2009, http://wmpoweruser.com/microsoft-patents-cool-multi-touch-virtual-keyboard/.

Tidwell, J., "Magnetism," from Designing Interfaces, Copyright © 2006 O'Reilly Media, Inc., pp. 279-280.

Toshiba, "Libretto® W100," Jun. 2010, 9 pages.

Dutch Search Report datd May 23, 2012, received in Dutch Patent Application No. 2007725, which corresponds to U.S. Appl. No. 13/076,395, 12 pages (Koch).

Dutch Search Report dated May 14, 2012, received in Dutch Patent Application No. 2007719, which corresponds to U.S. Appl. No. 13/076,393, 10 pages (Koch).

Dutch Search Report dated May 14, 2012, received in Dutch Patent Application No. 2007718, which corresponds to U.S. Appl. No. 13/076,391, 10 pages ( Koch).

Office Action dated Nov. 2, 2012, received in U.S. Appl. No. 13/076,392, 9 pages (Koch).

Ajidev, "iAnnotate," ajidev.com. 2010, www.ajidev.com/iannotate, 2 pages.

Ajidev, "Welcome to iAnnotate v 1.3!" Ajidev.com. 2010, www.ajidev.com, 37 pages.

Chen et al., "Navigation Techniques for Dual-Display E-Book Readers," CHI 2008 Proceedings, Apr. 02008, Florence, Italy, 10 pages.

Find eBook Readers, "PDF on the iPad-iAnnotate Review-Annotations!" Find eBook Readers Blog, May 2010, http://findebookreaders.com/blog/2010/05/pdf-on-the-ipad-iannotate-review-annotations/, 9 pages.

Goodiware, "GoodReader User Manual; Viewing PDF Files," goodiware.com, 2010, http://www.goodreader.net/gr-man-view-pdf.html#annots, 11 pages.

Lee et al., "smartNote for iPad User Guide," mysmartnote.net, Version 1.4, 2010, http://mysmartnet.net, 17 pages.

Mobipocket, "Mobipocket Reader Desktop 6.2," Mobipocket .com, 2010, http://www.mobipocket.com/en/downloadsoft/productdetailsreader.asp, 3 pages.

Readdle Inc., "PDF Expert for iPad User's Guide," Readdle Inc., 2010, 15 pages.

Vimeo, "Smart Design magazine UX concept," vimeo.com, 2010, http://vimeo.com/10813230, 2 pages.

Willems et al., "Pen gestures in online map and photograph annotation tasks," Oct. 2006, 6 pages.

International Search Report and Written Opinion dated May 23, 2011, received in International Application No. PCT/US2011/029957, which corresponds to U.S. Appl. No. 12/752,003, 11 pages (Tribble).

Dutch Search Report and Written Opinion dated May 4, 2012, received in Dutch Patent Application No. 2007721, which corresponds to U.S. Appl. No. 13/076,389, 16 pages (Koch).

International Search Report and Written Opinion dated May 7, 2012, received in International Application No. PCT/US2011/059085, which corresponds to U.S. Appl. No. 13/076,389, 17 pages (Koch).

Dutch Search Report and Written Opinion dated May 4, 2012, received in Dutch Patent Application No. 2007723, which corresponds to U.S. Appl. No. 13/076,392, 10 pages (Koch).

International Search Report and Written Opinion dated May 7, 2012, received in International Application No. PCT/US2011/059088, which corresponds to U.S. Appl. No. 13/076,392, 12 pages (Koch).

Invitation to Pay Additional Fees dated May 23, 2012, received in International Patent Application No. PCT/US2011/059092, which corresponds to U.S. Appl. No. 13/076,395, 9 pages (Koch).

International Search Report and Written Opinion dated Feb. 11, 2013, received in International Application No. PCT/US2011/059092, which corresponds to U.S. Appl. No. 13/076,395, 35 pages (Koch).

International Search Report and Written Opinion dated May 7, 2012, received in International Application No. PCT/US2011/059101, which corresponds to U.S. Appl. No. 13/076,393, 12 pages (Koch).

(56) References Cited

OTHER PUBLICATIONS

International Search Report and Written Opinion dated May 7, 2012, received in International Application No. PCT/US2011/059106, which corresponds to U.S. Appl. No. 13/076,391, 13 pages (Koch).
Dutch Search Report and Written Opinion dated May 4, 2012, received in Dutch Patent Application No. 2007722, which corresponds to U.S. Appl. No. 13/243,599, 10 pages (Koch).
International Search Report and Written Opinion dated May 7, 2012, received in International Application No. PCT/US2011/059204, which corresponds to U.S. Appl. No. 13/243,599, 10 pages (Koch).
Office Action dated Feb. 22, 2013, received in U.S. Appl. No. 12/752,003, 39 pages (Tribble).
Office Action dated Oct. 3, 2012, received in U.S. Appl. No. 13/076,389, 11 pages (Koch).
Office Action dated Dec. 13, 2012, received in U.S. Appl. No. 13/076,395, 17 pages (Koch).
Office Action dated Dec. 14, 2012, received in U.S. Appl. No. 13/076,397, 20 pages (Koch).
Office Action dated Feb. 12, 2013, received in U.S. Appl. No. 13/076,399, 28 pages (Koch).
Office Action dated Dec. 17, 2012, received in U.S. Appl. No. 13/076,401, 16 pages (Koch).
Office Action dated Nov. 9, 2012, received in U.S. Appl. No. 13/077,754, 9 pages (Migos).
Office Action dated Nov. 2, 2012, received in U.S. Appl. No. 13/076,393, 8 pages (Koch).
Office Action dated Jan. 17, 2013, received in U.S. Appl. No. 13/243,599, 17 pages (Koch).
Guimbretière, F., "Paper Augmented Digital Documents," UIST '03, Nov. 2003, Vancouver, BC, Canada, 10 pages.
International Preliminary Report on Patentability dated May 16, 2013, received in International Application No. PCT/US2011/059085, which corresponds to U.S. Appl. No. 13/076,389, 10 pages (Koch).
International Preliminary Report on Patentability dated May 16, 2013, received in International Application No. PCT/US2011/059088, which corresponds to U.S. Appl. No. 13/076,392, 10 pages (Koch).
International Preliminay Report on Patentability dated Jul. 4, 2013, received in International Patent Application No. PCT/US2011/059092, which corresponds to U.S. Appl. No. 13/076,395, 16 pages (Koch).
International Preliminary Report on Patentability dated May 16, 2013, received in International Application No. PCT/US2011/059101, which corresponds to U.S. Application No. PCT/US2011/059101, 10 pages (Koch).
International Preliminary Report on Patentability dated May 16, 2013, received in International Patent No. PCT/US2011/059106, which corresponds to U.S. Appl. No. 13/076,391, 10 page (Koch).
International Preliminary Report on Patenability dated May 16, 2013, received in International Application No. PCT/US2011/059204, which corresponds to U.S. Appl. No. 13/243,599, 8 pages (Koch).
International Search Report and Written Opinion dated Jul. 24, 2013, received in International Application No. PCT/US2013/037423, which corresponds to U.S. Appl. No. 13/797,979, 11 pages (Koch).
Notice of Allowance dated May 2, 2013, received in U.S. Appl. No. 13/076,389, 9 pages (Koch).
Notice of Allowance dated May 28, 2013, received in U.S. Appl. No. 13/076,389, 10 pages (Koch).
Notice of Allowance dated Aug. 6, 2013, received in U.S. Appl. No. 13/076,392, 14 pages (Koch).
Notice of Allowance dated Jul. 18, 2013, received in U.S. Appl. No. 13/076,401, 10 pages (Koch).
Office Action dated Jun. 13, 2013, received in U.S. Appl. No. 13/076,411, 15 pages (Migos).
Office Action dated Aug. 21, 2013, received in U.S. Appl. No. 13/076,414, 14 pages.
Office Action dated Jul. 15, 2013, received in U.S. Appl. No. 13/077,754, 17 pages (Migos).
Office Action dated Feb. 7, 2013, received in U.S. Appl. No. 13/076,391, 20 pages (Koch).
Office Action dated Sep. 19, 2013, received in U.S. Appl. No. 12/752,003, 49 pages (Tribble).
Office Action dated Oct. 23, 2013, received in U.S. Appl. No. 13/076,395, 18 pages (Koch).
Notice of Allowance dated Sep. 16, 2013, received in U.S. Appl. No. 13/076,397, 19 pages (Koch).
Notice of Allowance dated Oct. 10, 2013, received in U.S. Appl. No. 13/076,399, 15 pages (Koch).
Office Action dated Dec. 5, 2013, received in U.S. Appl. No. 13/076,407, 25 pages (Migos).
Final Office Action dated Nov. 15, 2013, received in U.S. Appl. No. 13/076,411, 14 pages (Migos).
Notice of Allowance dated Oct. 3, 2013, received in U.S. Appl. No. 13/076,393, 23 pages (Koch).
Office Action dated Nov. 7, 2013, received in U.S. Appl. No. 13/076,391, 14 pages (Koch).
Notice of Allowance dated Aug. 6, 2013, received in U.S. Appl. No. 13/243,599, 14 pages (Koch).
Examiner's Report dated Aug. 5, 2013 received in Australian Patent Application No. 2011323269, which corresponds to U.S. Appl. No. 13/243,599, 3 pages (Koch).
Office Action dated Dec. 9, 2013, received in Korean Patent Application No. 20127030352, which corresponds to U.S. Appl. No. 13/243,599, 3 pages (Koch).
Final Office Action received for U.S. Appl. No. 12/752,003, mailed on Jun. 11, 2013, 40 pages.
Non Final Office Action received fo U.S. Appl. No. 13/077,754, mailed on Mar. 21, 2014, 13 pages.
Wang et al., "Detecting and Leveraging Finger Orientation for Interaction with Direct-Touch Surfaces", ACM, 2009, pp. 23-32.
Wilson, Andrew D., "TouchLight: An Imaging Touch Screen and Display for Gesture-Based Interaction", 2004, 8 pages.
Apple Inc. vs. Samsung Electronics Co. Ltd. et al., Judgment, Aug. 24, 2011, 65 pages.
Apple Inc. vs. Samsung Electronics Co. Ltd., et al., Samsungs Motion to Supplement Invalidity Contentions filed Jan. 27, 2012 together with Exhibit 6, Jan. 27, 2012, 47 pages.
Apple Inc. vs. Samsung Electronics Co. Ltd., et al., Samsungs Patent Local Rule 3-3 and 3-4 Disclosures dated Oct. 7, 2011, together with Exhibits G-1 through G-7 and Exhibit H, Oct. 7, 2011, 287 pages.
HTC Europe Co. Ltd and Apple Inc. Invalidity Claim dated Apr. 5, 2012, together with annexes, 12 pages.
HTC Europe Co. Ltd and Apple Inc. invalidity Claim dated Jul. 29, 2011, together with amended Particulars of Claim and amended Grounds of Invalidity, 22 pages.
Motorola Mobility Opposition Grounds to Apple Inc. European Patent EP 2126678 dated Apr. 11, 2012, together with Exhibits E3, E4, and E5 re: CHT 2005, Apr. 2-7, 2005, Portland Oregon, USA, Apr. 2012, 53 pages.
Pleading notes Mr B.J. Berghuis van Woodman, Aug. 10-11, 2010, 16 pages.
Pleading notes Mr Kleemans, Mr Blomme and Mr Van Oorschot, Aug. 10, 2011, 35 pages.
Samsung Electronics GmbH/Apple Inc. Opposition dated Jan. 30, 2012, 27 pages.
Samsung Statement of Defense (Smartphones) Also Counterclaim, Jul. 20, 2011, 48 pages.
Samsung Statement of Defense (Tablets) Also Counterclaim, Jul. 20, 2011, 44 pages.
International Search Report and Written Opinion received for PCT Patent Application No. PCT/US2010/020263, mailed on Dec. 8, 2010, 11 pages.
International Preliminary Report on Patentability received for PCT Patent Application No. PCT/US2011/029957, mailed on Oct. 11, 2012, 8 pages.
International Preliminary Report on Patentability received for PCT Patent Application No. PCT/US2013/037423, issued on Dec. 31, 2014, 7 pages.
Office Action received for European Patent Application No. 10700014.3, mailed on Aug. 29, 2013, 6 pages.

(56) References Cited

OTHER PUBLICATIONS

Office Action received for European Patent Application No. 11784558.6, mailed on Jun. 23, 2014, 5 pages.
Office Action received for European Patent Application No. 11784560.2, mailed on Jun. 23, 2014, 5 pages.
Office Action received for European Patent Application No. 11784562.8, mailed on Feb. 21, 2014, 5 pages.
XDA-Developers, "FingerKeyboard2.1", available at <http://forum.xda-developers.com/showthread.php? t=487677>, retrieved on Apr. 16, 2013, 7 pages.
Office Action received for Australian Patent Application No. 2011323269, mailed on Sep. 3, 2014, 3 pages.
Office Action received for Australian Patent Application No. 2011323301, issued on Nov. 12, 2014, 3 pages.
Office Action received for Australian Patent Application No. 2011323375, mailed on Nov. 12, 2014, 4 pages.
Office Action received for Chinese Patent Application No. 201080001777.x, mailed on Jan. 28, 2013, Jan. 28, 2013, 12 pages. (English Translation only).
Office Action received for Chinese Patent Application No. 201080001777.x, mailed on Nov. 13, 2013, Nov. 13, 2013, 9 pages (4 pages of English Translation and 5 pages).
Office Action received for Japanese Patent Application No. 2012-547987, mailed on Nov. 22, 2013, Nov. 22, 2013, 5 pages (2 pages of English Translation and 3 pages).
Office Action received for Japanese Patent Application No. 2013-524269, mailed on Jul. 7, 2014, 5 pages (3 pages of English Translation and 2 pages).
Notice of Allowance received for Japanese Patent Application No. 2013-524269, mailed on Jan. 26, 2015, 3 pages. (See Communication under 37 CFR § 1.98(a) (3)).
Office Action received for Japanese Patent Application No. 2013-537812, mailed on Mar. 7, 2014, 7 pages (4 pages of English translation and 3 pages).
Notice of Allowance received for Japanese Patent Application No. 2013-537813, mailed on Sep. 29, 2014, 3 pages. (See Communication under 37 CFR § 1.98(a) (3)).
Office Action received for Japanese Patent Application No. 2013-537813, mailed on Apr. 4, 2014, 6 pages (4 pages of English Translation and 2 pages).
Office Action received for Japanese Patent Application No. 2013-537813, mailed on Aug. 8, 2014, 4 pages (2 pages of English Translation and 2 pages).
Office Action received for Korean Patent Application No. 10-2012-7020604, mailed on Oct. 11, 2013, 4 pages (1 page of English Translation and 3 pages).
Office Action received for Korean Patent Application No. 10-2012-7030352, mailed on Oct. 24, 2014, 3 pages. (See Communication under 37 CFR § 1.98(a) (3)).
Office Action received for Korean Patent Application No. 10-2013-7013933, mailed on Mar. 26, 2014, 6 pages (3 pages of English Translation and 3 pages).
Notice of Allowance received for Korean Patent Application No. 10-2013-7014110, mailed on Jan. 28, 2015, 2 pages. (See Communication under 37 CFR § 1.98(a) (3)).
Office Action received for Korean Patent Application No. 10-2013-7014110, mailed on Mar. 26, 2014, 7 pages (3 pages of English Translation and 4 pages).
Final Office Action received for U.S. Appl. No. No. 12/752,003, mailed on Sep. 26, 2013, 40 pages.
Non Final Office Action received for U.S. Appl. No. 12/752,003, mailed on Mar. 7, 2014, 64 pages.
Notice of Allowance received for U.S. Appl. No. 12/788,283, mailed on May 9, 2013, 13 pages.
Notice of Allowance received for U.S. Appl. No. 12/788,283, mailed on Sep. 16, 2013, 16 pages.
Non Final Office Action received for U.S. Appl. No. 12/788,283, mailed on May 11, 2012, 12 pages.
Non Final Office Action received for U.S. Appl. No. 12/788,283, mailed on Oct. 12, 2012, 14 pages.
Non-Final Office Action received for U.S. Appl. No. 12/794,625, mailed on Oct. 26, 2012, 7 pages.
Non-Final Office Action received for U.S. Appl. No. 13/076,391, mailed on Jul. 16, 2014, 11 pages.
Notice of Allowance received for U.S. Appl. No. 13/076,391, mailed on Jan. 29, 2015, 10 pages.
Non-Final Office Action received for U.S. Appl. No. 13/076,395, mailed on Jul. 17, 2014, 10 pages.
Notice of Allowance received for U.S. Appl. No. 13/076,395, mailed on Jan. 30, 2015, 8 pages.
Notice of Allowance received for U.S. Appl. No. 13/076,397, mailed on Nov. 26, 2013, 11 pages.
Notice of Allowance received for U.S. Appl. No. 13/076,407, mailed on May 20, 2014, 9 pages.
Final Office Action received for U.S. Patent Application No. 13/076,414, mailed on Feb. 19, 2014, 10 pages.
Final Office Action received for U.S. Appl. No. 13/077,754 mailed on Jan. 14, 2015, 16 pages.
Non Final Office Action received for U.S. Appl. No. 13/797,979, mailed on Jan. 16, 2015, 26 pages.
Non-Final Office Action received for U.S. Appl. No. 14/083,349, mailed on May 27, 2014, 18 pages.
Notice of Allowance received for U.S. Appl. No. 14/083,349, mailed on Jan. 23, 2015, 9 pages.
Crackberry.Com, "Quick Way to Hide Keyboard", available at <http://forums.crackberry.com/f86/quick-way-hide-keyboard-103108/>, Nov. 26, 2008, 6 pages.
Grossman et al., "The Bubble Cursor: Enhancing Target Acquisition by Dynamic Resizing of the Cursor's Activation Area", Papers: Smart Interaction Techniques 1, Apr. 2-7, 2005, pp. 281-290.
Hertzum et al., "Input Techniques that Dynamically Change their Cursor Activation Area: A Comparison of Bubble and Cell Cursors", International Journal of Human-Computer Studies, vol. 65, No. 10, 2007, 38 pages.
HTC Corporation, "DROID ERIS User Guide", available at <http://memberamerica.htc.com/download/ Web_materials/Manual/DOID_ERIS_Verizon/DROID_ERIS_Verizon_English_UM_11_5.pdf>,retrieved on 2009, 238 pages.
Ren et al., "The Adaptive Hybrid Cursor: a Pressure-Based Target Selection Technique for Pen-Based User interfaces", INTERACT07 Proceedings of the 11th IFIP TC 13 international conference on Human-computer interaction, Sep. 10, 2007, 14 pages.
Tidwell, Jenifer, "Magnetism", Designing Interfaces, Section 85, 2006, pp. 261-262.
Office Action received for Korean Patent Application No. 10-2012-7030352, mailed on Feb. 23, 2015, 4 pages.(See Communication under 37 CFR § 1.98(a) (3)).
Notice of Allowance received for Korean Patent Application No. 10-2013-7013933, mailed on Feb. 26, 2015, 2 pages.(See Communication under 37 CFR § 1.98(a) (3)).
Notice of Acceptance received for Australian Patent Application No. 2011323269, mailed on Apr. 16, 2015, 3 pages.

\* cited by examiner

But, in a larger sense, we can not dedicate, we can not consecrate, we can not hallow this ground. The brave men, living and dead, who struggled here, have consecrated it, far above our poor power to add or detract. The world will little note, nor long remember what we say here, but it can never forget what they did here. It is for us the living, rather, to be dedicated here to the unfinished work which they who fought here have thus far so nobly advanced. It is rather for us to be here dedicated to the great task remaining before us—that from these honored dead we take increased devotion to that cause for which they gave the last full measure of devotion—that we here highly Page 5

502-2

Multifunction Device 100

Touch Screen 112

Figure 5C

704 Determine that the first portion of the gesture has a first gesture characteristic

706 A user interface that includes at least a portion of an electronic document is displayed on a display, and determining whether the first portion of the gesture has a first gesture characteristic includes determining whether the first portion of the gesture is detected at a location on a touch-sensitive surface that corresponds to a navigation preferred region of the displayed user interface.

708 The electronic document includes content, and the navigation preferred regions are regions that exclude content of the electronic document.

710 The electronic document includes a plurality of paragraphs of text, and the navigation preferred regions are regions that are defined in accordance with locations of the plurality of paragraphs in the displayed user interface.

712 The electronic document includes a plurality of lines of text, and the navigation preferred regions are regions that are defined in accordance with locations of the plurality of lines of text in the displayed user interface.

714 A user interface that includes at least a portion of an electronic document is displayed on the display, and determining whether the first portion of the gesture has a first gesture characteristic includes determining whether the first portion of the gesture is detected at a location on the touch-sensitive surface that corresponds to an annotation preferred region of the displayed user interface.

716 The electronic document includes a plurality of words having a grammatical structure, and the annotation preferred regions are regions that are defined in accordance with the grammatical structure of the electronic document

718 The electronic document includes a plurality of words, and the annotation preferred regions are regions that are defined in accordance with locations of the plurality words in the displayed user interface

720 The electronic document includes a plurality of terms including one or more emphasized terms, and the annotation preferred regions are regions that are defined in accordance with locations of the emphasized terms in the displayed user interface

Figure 7B

704 Determine that the first portion of the gesture has a first gesture characteristic

722 Determining whether the first portion of the gesture has a first gesture characteristic includes determining whether the first portion of the gesture has a speed that is greater than a predefined speed threshold

724 Determining whether the first portion of the gesture has a first gesture characteristic includes determining whether the first portion of the gesture has acceleration that is greater than a predefined acceleration threshold

726 Determining whether the first portion of the gesture has a first gesture characteristic includes determining whether the first portion of the gesture includes movement of a contact that matches a predefined movement profile

728 Determining whether the first portion of the gesture has the first gesture characteristic includes determining whether the first portion of the gesture has a component of movement in a predefined direction

730 The first type of operation is a navigation operation, and the second type of operation is an annotation operation. A user interface including at least a portion of a document that includes text is displayed on the display. The predefined direction is a reading direction for the text, and in accordance with a determination that the first portion of the gesture has a component of movement in the predefined direction, the dynamic disambiguation threshold is adjusted to increase the range of values that correspond to the annotation operation.

732 In accordance with a determination that the first portion of the gesture has a component of movement in a direction that is opposite to the predefined direction, the dynamic disambiguation threshold is adjusted to increase the range of values that correspond to the navigation operation

734 The predefined direction is determined in accordance with a language of the text

736 The first gesture characteristic is determined in accordance with previous inputs detected by the device

Figure 7C

756 The first type of operation is a navigation operation for an electronic document displayed on the display, and the second type of operation is an annotation operation for the electronic document. The first gesture characteristic is a navigation characteristic. In accordance with a determination that the gesture has the first gesture characteristic, the dynamic disambiguation threshold is adjusted to increase the range of values that correspond to the navigation operation.

758 A user interface that includes a current portion of the electronic document is displayed on the display, and the navigation operation includes displaying a different portion of the electronic document in the user interface in accordance with the gesture.

760 The first type of operation is a navigation operation for an electronic document displayed on the display, and the second type of operation is an annotation operation for the electronic document. The first gesture characteristic is an annotation characteristic. In accordance with a determination that the gesture has the first gesture characteristic, the dynamic disambiguation threshold is adjusted to increase the range of values that correspond to the annotation operation.

762 A user interface that includes at least a portion of the electronic document having predefined content is displayed on the display, and the annotation operation includes adding additional content to the predefined content.

Figure 7D

DEVICE, METHOD, AND GRAPHICAL USER INTERFACE WITH A DYNAMIC GESTURE DISAMBIGUATION THRESHOLD

RELATED APPLICATIONS

This application claims priority to U.S. Provisional Application Ser. No. 61/435,779, filed Jan. 24, 2011, entitled "Device, Method, and Graphical User Interface with a Dynamic Gesture Disambiguation Threshold," which is incorporated by reference herein in its entirety.

This application is related to U.S. application Ser. No. 13/077754, filed Mar. 31, 2011, entitled "Device, Method, and Graphical User Interface with a Dynamic Gesture Disambiguation Threshold," which is incorporated by reference herein in its entirety.

TECHNICAL FIELD

This relates generally to electronic devices with touch-sensitive surfaces, including but not limited to electronic devices that interpret and respond to user gestures on a touch-sensitive surface.

BACKGROUND

The use of touch-sensitive surfaces as input devices for computers and other electronic computing devices has increased significantly in recent years. Exemplary touch-sensitive surfaces include touch pads and touch screen displays. Such surfaces are widely used to manipulate user interface objects on a display.

For electronic devices with touch-sensitive surfaces, existing methods for interpreting user gestures are inefficient. In particular, electronic devices may not accurately interpret gesture inputs in accordance with a user's intent. For example, when displaying a page in an electronic document, such devices may turn to a next page in the electronic document in response to the user's gesture, when the user actually wanted to highlight a portion of the displayed page. Thus, the user has to go back to the correct page and then retry the gesture input to highlight the portion of the correct page. This is tedious and creates a significant cognitive burden on the user. In addition, such undo-and-retry actions waste time and energy. This latter consideration is particularly important in battery-operated devices.

SUMMARY

Accordingly, there is a need for electronic devices with more accurate and efficient methods and interfaces for interpreting user gestures on a touch-sensitive surface. Such methods and interfaces may complement or replace conventional methods for interpreting user gestures on a touch-sensitive surface. Such methods and interfaces reduce the cognitive burden on a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions may include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a non-transitory computer readable storage medium or other computer program product configured for execution by one or more processors.

In accordance with some embodiments, a method is performed at an electronic device with a display and a touch-sensitive surface. The method includes: detecting a first portion of a gesture, and determining that the first portion of the gesture has a first gesture characteristic. The method also includes, in response to determining that the first portion of the gesture has a first gesture characteristic, selecting a dynamic disambiguation threshold in accordance with the first gesture characteristic. The dynamic disambiguation threshold is used to determine whether to perform a first type of operation or a second type of operation when a first kind of gesture is detected. The method includes determining that the gesture is a gesture of the first kind of gesture, and after selecting the dynamic disambiguation threshold, determining whether the gesture meets the dynamic disambiguation threshold. The method includes, in accordance with a determination that the gesture meets the dynamic disambiguation threshold, performing the first type of operation in accordance with the gesture, and in accordance with a determination that the gesture does not meet the dynamic disambiguation threshold, performing the second type of operation in accordance with the gesture.

In accordance with some embodiments, an electronic device includes a display, a touch-sensitive surface, one or more processors, memory, and one or more programs. The one or more programs are stored in the memory and configured to be executed by the one or more processors. The one or more programs include instructions for: detecting a first portion of a gesture, and determining that the first portion of the gesture has a first gesture characteristic. The one or more programs also include instructions for, in response to determining that the first portion of the gesture has a first gesture characteristic, selecting a dynamic disambiguation threshold in accordance with the first gesture characteristic. The dynamic disambiguation threshold is used to determine whether to perform a first type of operation or a second type of operation when a first kind of gesture is detected. The one or more programs include instructions for determining that the gesture is a gesture of the first kind of gesture, and after selecting the dynamic disambiguation threshold, determining whether the gesture meets the dynamic disambiguation threshold. The one or more programs furthermore include instructions for: in accordance with a determination that the gesture meets the dynamic disambiguation threshold, performing the first type of operation in accordance with the gesture; and in accordance with a determination that the gesture does not meet the dynamic disambiguation threshold, performing the second type of operation in accordance with the gesture.

In accordance with some embodiments, a graphical user interface on an electronic device with a display, a touch-sensitive surface, a memory, and one or more processors to execute one or more programs stored in the memory includes at least a portion of an electronic document. A first portion of a gesture is detected, and the first portion of the gesture is determined to have a first gesture characteristic. In response to determining that the first portion of the gesture has the first gesture characteristic, a dynamic disambiguation threshold is selected in accordance with the first gesture characteristic. The dynamic disambiguation threshold is used to determine whether to perform a first type of operation or a second type of operation when a first kind of gesture is detected. The gesture is determined to be a gesture of the first kind of gesture. After selecting the dynamic disambiguation threshold, whether the gesture meets the dynamic disambiguation threshold is determined. In accordance with a determination that the gesture meets the dynamic disambiguation threshold, the first type of operation is performed in accordance with the gesture, and in accordance with a determination that the gesture does not meet the dynamic disambiguation threshold, the second type of operation is performed in accordance with the gesture.

In accordance with some embodiments, a computer readable storage medium has stored therein instructions which when executed by an electronic device with a display and a touch-sensitive surface, cause the device to: detect a first portion of a gesture, and determine that the first portion of the gesture has a first gesture characteristic. The instructions also cause the device to, in response to determining that the first portion of the gesture has a first gesture characteristic, select a dynamic disambiguation threshold in accordance with the first gesture characteristic. The dynamic disambiguation threshold is used to determine whether to perform a first type of operation or a second type of operation when a first kind of gesture is detected. The instructions cause the device to determine that the gesture is a gesture of the first kind of gesture, and after selecting the dynamic disambiguation threshold, determine whether the gesture meets the dynamic disambiguation threshold. The instructions furthermore cause the device to, in accordance with a determination that the gesture meets the dynamic disambiguation threshold, perform the first type of operation in accordance with the gesture, and in accordance with a determination that the gesture does not meet the dynamic disambiguation threshold, perform the second type of operation in accordance with the gesture.

In accordance with some embodiments, an electronic device includes: a display; a touch-sensitive surface; means for detecting a first portion of a gesture; and means for determining that the first portion of the gesture has a first gesture characteristic. The electronic device also includes means, enabled in response to determining that the first portion of the gesture has a first gesture characteristic, for selecting a dynamic disambiguation threshold in accordance with the first gesture characteristic. The dynamic disambiguation threshold is used to determine whether to perform a first type of operation or a second type of operation when a first kind of gesture is detected. The electronic device includes means for determining that the gesture is a gesture of the first kind of gesture; and means, enabled after selecting the dynamic disambiguation threshold, for determining whether the gesture meets the dynamic disambiguation threshold. The electronic device furthermore includes means, enabled in accordance with a determination that the gesture meets the dynamic disambiguation threshold, for performing the first type of operation in accordance with the gesture; and means, enabled in accordance with a determination that the gesture does not meet the dynamic disambiguation threshold, for performing the second type of operation in accordance with the gesture.

In accordance with some embodiments, an information processing apparatus for use in an electronic device with a display and a touch-sensitive surface includes: means for means for detecting a first portion of a gesture; and means for determining that the first portion of the gesture has a first gesture characteristic. The information processing apparatus also includes means, enabled in response to determining that the first portion of the gesture has a first gesture characteristic, for selecting a dynamic disambiguation threshold in accordance with the first gesture characteristic. The dynamic disambiguation threshold is used to determine whether to perform a first type of operation or a second type of operation when a first kind of gesture is detected. The information processing apparatus includes means for determining that the gesture is a gesture of the first kind of gesture; and means, enabled after selecting the dynamic disambiguation threshold, for determining whether the gesture meets the dynamic disambiguation threshold. The information processing apparatus furthermore includes means, enabled in accordance with a determination that the gesture meets the dynamic disambiguation threshold, for performing the first type of operation in accordance with the gesture; and means, enabled in accordance with a determination that the gesture does not meet the dynamic disambiguation threshold, for performing the second type of operation in accordance with the gesture.

In accordance with some embodiments, a method is performed at an electronic device with a display and a touch-sensitive surface. The method includes displaying at least a portion of an electronic document that includes text that has a reading direction, and detecting a gesture on the touch-sensitive surface. The gesture includes movement in a first direction on the touch-sensitive surface that corresponds to a second direction on the display. The method also includes, in response to detecting the gesture: in accordance with a determination that the second direction on the display includes a directional component that is opposite to the reading direction, performing a navigation operation, and in accordance with a determination that the second direction on the display includes a directional component in the reading direction and that the gesture meets predefined criteria, performing an annotation operation.

In accordance with some embodiments, an electronic device includes a display, a touch-sensitive surface, one or more processors, memory, and one or more programs. The one or more programs are stored in the memory and configured to be executed by the one or more processors. The one or more programs include instructions for: displaying at least a portion of an electronic document that includes text that has a reading direction; and detecting a gesture on the touch-sensitive surface. The gesture includes movement in a first direction on the touch-sensitive surface that corresponds to a second direction on the display. The one or more programs also include instructions for, in response to detecting the gesture: in accordance with a determination that the second direction on the display includes a directional component that is opposite to the reading direction, performing a navigation operation, and in accordance with a determination that the second direction on the display includes a directional component in the reading direction and that the gesture meets predefined criteria, performing an annotation operation.

In accordance with some embodiments, a graphical user interface on an electronic device with a display, a touch-sensitive surface, a memory, and one or more processors to execute one or more programs stored in the memory includes at least a portion of an electronic document that includes text that has a reading direction. A gesture is detected on the touch-sensitive surface. The gesture includes movement in a first direction on the touch-sensitive surface that corresponds to a second direction on the display. In response to detecting the gesture, in accordance with a determination that the second direction on the display includes a directional component that is opposite to the reading direction, a navigation operation is performed, and in accordance with a determination that the second direction on the display includes a directional component in the reading direction and that the gesture meets predefined criteria, an annotation operation is performed.

In accordance with some embodiments, a computer readable storage medium has stored therein instructions which when executed by an electronic device with a display and a touch-sensitive surface, cause the device to: display at least a portion of an electronic document that includes text that has a reading direction, and detect a gesture on the touch-sensitive surface. The gesture includes movement in a first direction on the touch-sensitive surface that corresponds to a second direction on the display. The instructions cause the device to, in response to detecting the gesture: in accordance with a determination that the second direction on the display includes a directional component that is opposite to the reading direction, perform a navigation operation; and in accordance with a determination that the second direction on the display includes a directional component in the reading direction and that the gesture meets predefined criteria, perform an annotation operation.

In accordance with some embodiments, an electronic device includes: a display; a touch-sensitive surface; means for displaying at least a portion of an electronic document that includes text that has a reading direction; and means for detecting a gesture on the touch-sensitive surface. The gesture includes movement in a first direction on the touch-sensitive surface that corresponds to a second direction on the display. The electronic device includes means, enabled in response to detecting the gesture, including: means, enabled in accordance with a determination that the second direction on the display includes a directional component that is opposite to the reading direction, for performing a navigation operation; and means, enabled in accordance with a determination that the second direction on the display includes a directional component in the reading direction and that the gesture meets predefined criteria, for performing an annotation operation.

In accordance with some embodiments, an information processing apparatus for use in an electronic device with a display and a touch-sensitive surface includes: means for displaying at least a portion of an electronic document that includes text that has a reading direction; and means for detecting a gesture on the touch-sensitive surface. The gesture includes movement in a first direction on the touch-sensitive surface that corresponds to a second direction on the display. The information processing apparatus includes means, enabled in response to detecting the gesture, including: means, enabled in accordance with a determination that the second direction on the display includes a directional component that is opposite to the reading direction, for performing a navigation operation; and means, enabled in accordance with a determination that the second direction on the display includes a directional component in the reading direction and that the gesture meets predefined criteria, for performing an annotation operation.

In accordance with some embodiments, an electronic device includes a display unit; a touch-sensitive surface unit configured to detect a first portion of a gesture; and a processing unit coupled to the display unit and the touch-sensitive surface unit. The processing unit is configured to: determine that the first portion of the gesture has a first gesture characteristic; and in response to determining that the first portion of the gesture has a first gesture characteristic, select a dynamic disambiguation threshold in accordance with the first gesture characteristic. The dynamic disambiguation threshold is used to determine whether to perform a first type of operation or a second type of operation when a first kind of gesture is detected on the touch-sensitive surface unit. The processing unit is also configured to: determine that the gesture is a gesture of the first kind of gesture; after selecting the dynamic disambiguation threshold, determine whether the gesture meets the dynamic disambiguation threshold; in accordance with a determination that the gesture meets the dynamic disambiguation threshold, perform the first type of operation in accordance with the gesture; and in accordance with a determination that the gesture does not meet the dynamic disambiguation threshold, perform the second type of operation in accordance with the gesture.

In accordance with some embodiments, an electronic device includes a display unit configured to display at least a portion of an electronic document that includes text that has a reading direction on the display unit, and a touch-sensitive surface unit configured to detect a gesture. The gesture includes movement in a first direction on the touch-sensitive surface unit that corresponds to a second direction on the display unit. The electronic device 1000 also includes a processing unit coupled to the display unit and the touch-sensitive surface unit. The processing unit is configured to, in response to detecting the gesture: in accordance with a determination that the second direction on the display unit includes a directional component that is opposite to the reading direction, perform a navigation operation; and in accordance with a determination that the second direction on the display unit includes a directional component in the reading direction and that the gesture meets predefined criteria, perform an annotation operation.

Thus, electronic devices with displays and touch-sensitive surfaces are provided with faster, more efficient methods and interfaces for interpreting user gestures, thereby increasing the effectiveness, efficiency, and user satisfaction with such devices. Such methods and interfaces may complement or replace conventional methods for interpreting user gestures on a touch-sensitive surface.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

FIGS. 5A-5C illustrate exemplary user interfaces for navigating and annotating an electronic document in accordance with some embodiments.

FIGS. 7A-7D are flow diagrams illustrating a method of using a dynamic disambiguation threshold to interpret a gesture in accordance with some embodiments.

DESCRIPTION OF EMBODIMENTS

Many electronic devices receive gesture inputs on touch-sensitive surfaces. Such devices often have difficulty accurately and efficiently interpreting gesture inputs from users. With such devices, the users may need to undo and repeat gestures until desired operations are performed, which wastes energy and creates a cognitive burden for the users. The embodiments described below address this problem by providing a dynamic disambiguation threshold that is used to determine whether to perform a first type of operation (e.g., a navigation operation in an electronic document) or a second type of operation (e.g., an annotation operation in the electronic document). The dynamic disambiguation threshold (e.g., a speed threshold) is selected in accordance with an initial characteristic of the gesture (e.g., an initial location and/or speed of the gesture), as the initial characteristic of the gesture may indicate the user's intent. For example, an initial contact in the margin of an electronic document is more likely to be the start of a navigation gesture, so the speed threshold is lowered so that more finger movements will be interpreted as navigation gestures (e.g., page turning gestures) rather than as annotation gestures (e.g., highlighting gestures). Conversely, an initial contact in the text of an electronic document is more likely to be the start of an annotation gesture, so the speed threshold is raised so that more finger movements will be interpreted as annotation gestures rather than as navigation gestures. As another example, a high initial speed of a contact is more likely to be the start of a navigation gesture, so the speed threshold is lowered so that more finger movements will be interpreted as navigation gestures rather than as annotation gestures. Conversely, a nearly stationary initial contact is more likely to be the start of an annotation gesture, so the speed threshold is raised so that more finger movements will be interpreted as annotation gestures rather than as navigation gestures. When the gesture satisfies the dynamic disambiguation threshold (e.g., the gesture is faster than the dynamic speed threshold), the device performs the first type of operation (e.g., a navigation operation), and when the gesture does not satisfy the dynamic disambiguation threshold (e.g., the gesture is slower than the dynamic speed threshold), the device performs the second type of operation (e.g., an annotation operation). This method reduces misinterpretation of gesture inputs, thereby creating a more efficient human-machine interface.

Figure 5A:
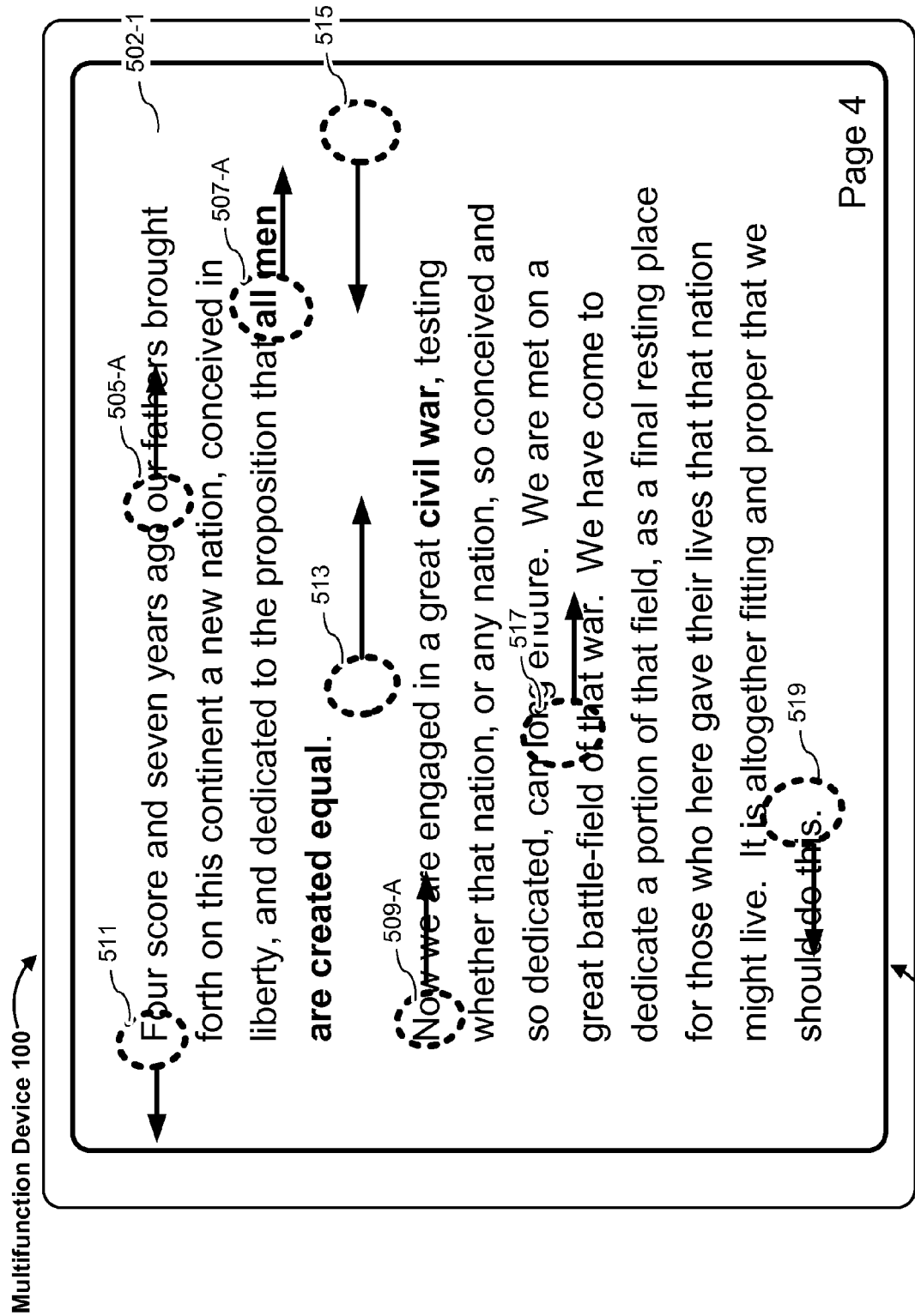
Figure 5B:
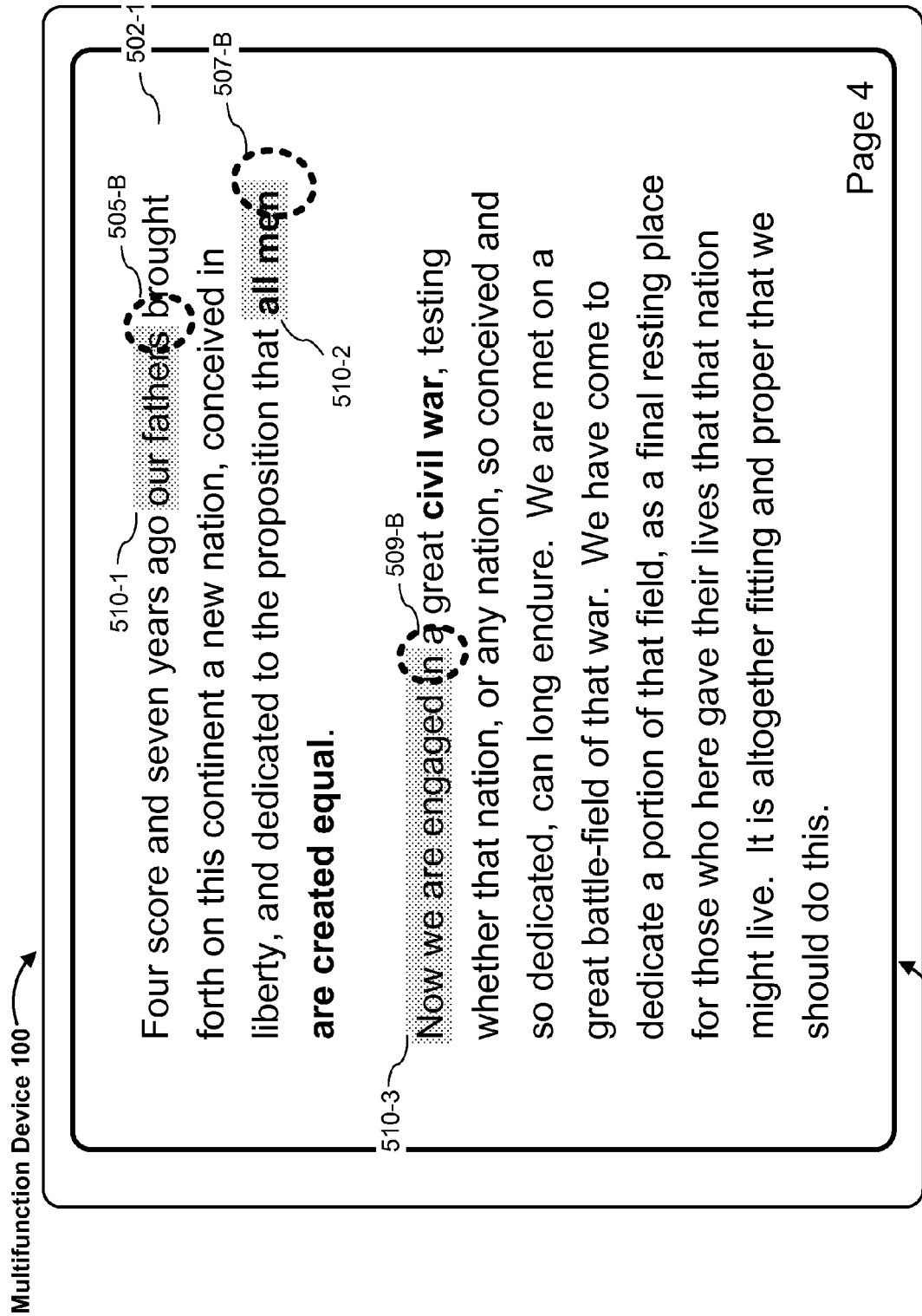
Figure 6:
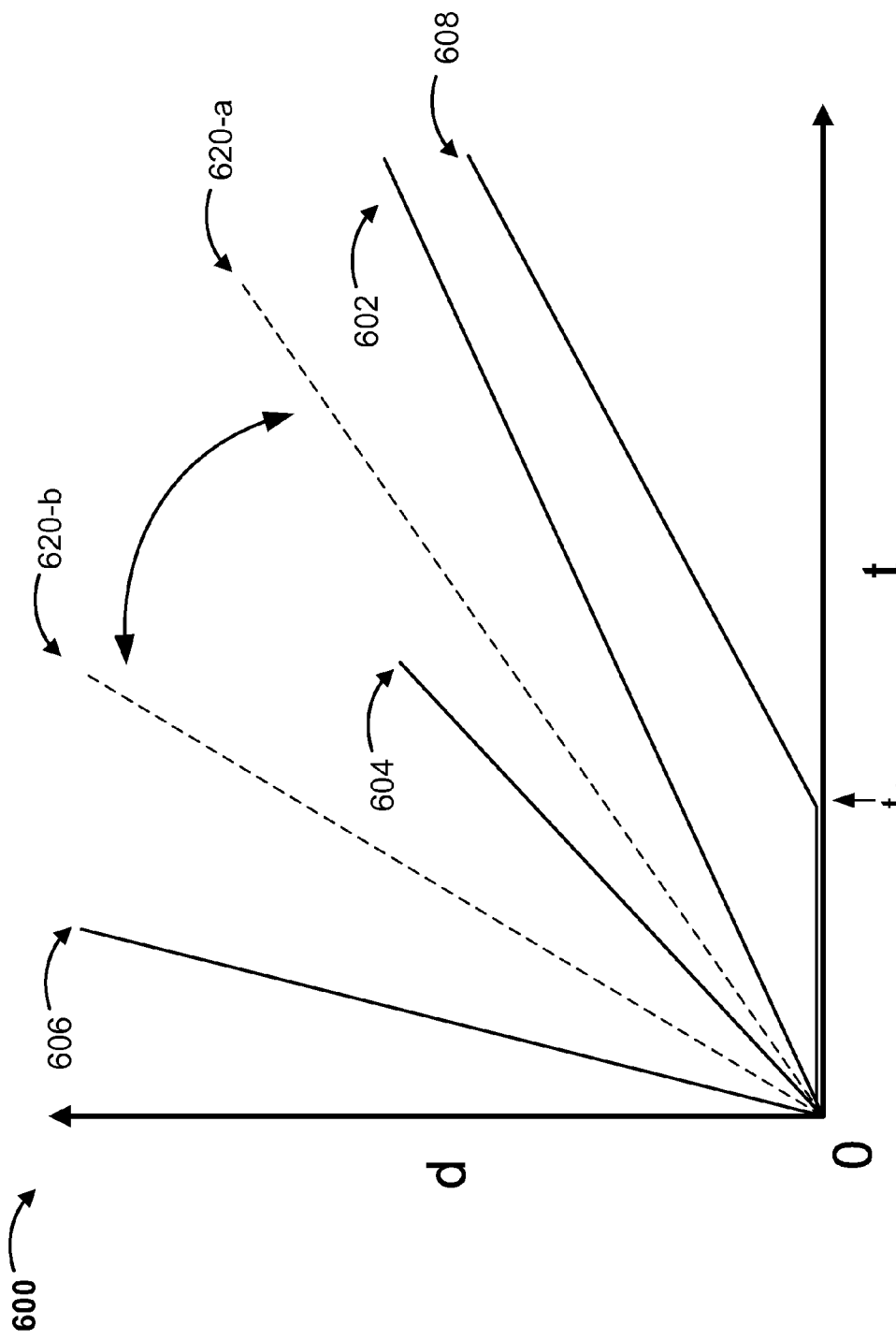
FIG. 6 illustrates exemplary functions representing movements of respective finger contacts in respective gestures in accordance with some embodiments.
Figure 7A:
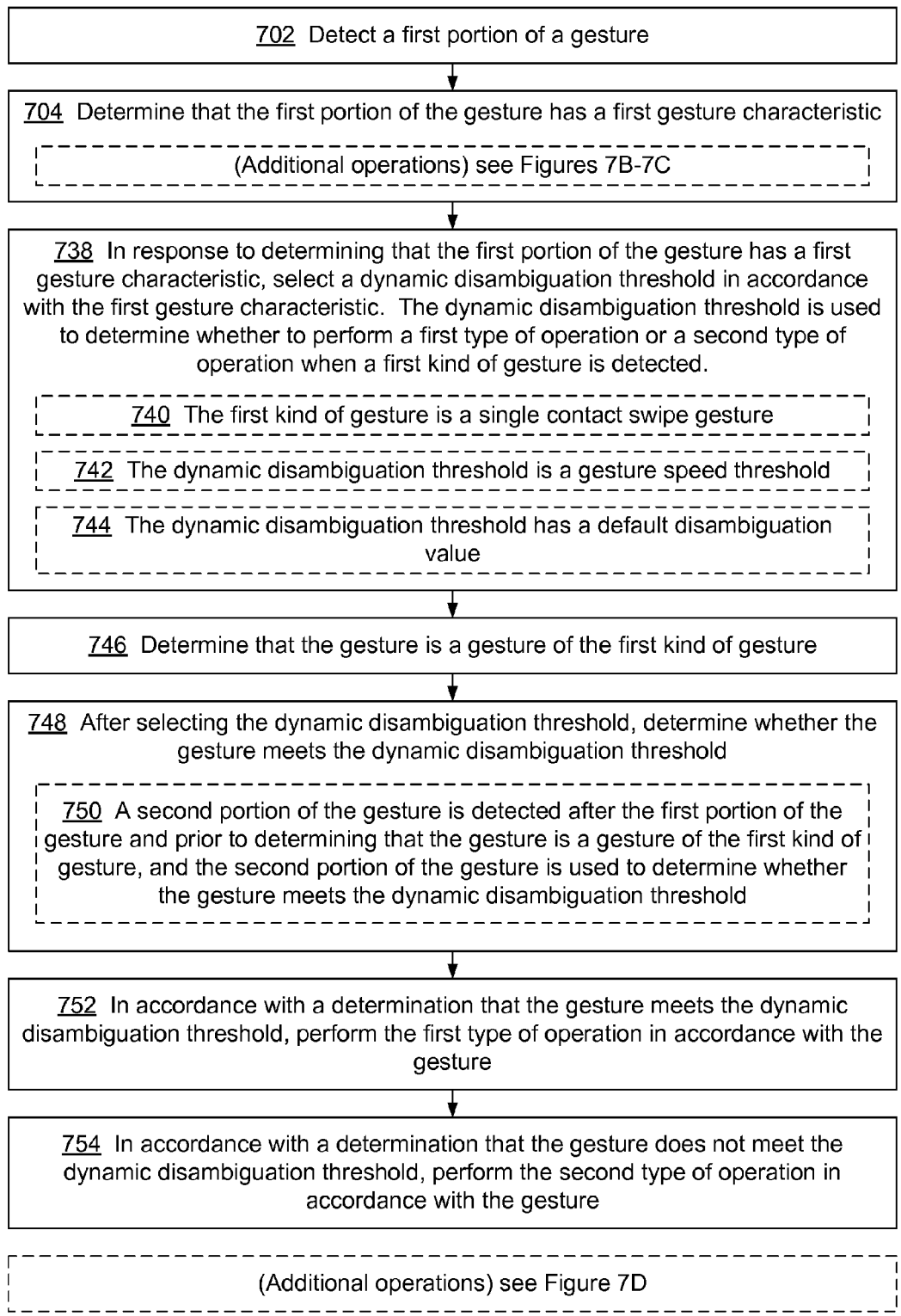

Below, FIGS. 1A-1B, 2, 3, 9, and 10 provide a description of exemplary devices. FIGS. 4A-4B and 5A-5C illustrate exemplary user interfaces for navigating through, and annotating, an electronic document. FIG. 6 illustrates gesture characteristics based on exemplary movements of finger contacts. FIGS. 7A-7D and FIG. 8 are flow diagrams illustrating methods of using a dynamic disambiguation threshold to interpret a gesture, and interpreting a gesture as a navigation operation or an annotation operation for an electronic document, respectively. The user interfaces in FIGS. 5A-5C are used to illustrate the processes in FIGS. 7A-7D and FIG. 8.

Exemplary Devices

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad).

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Figure 1A:
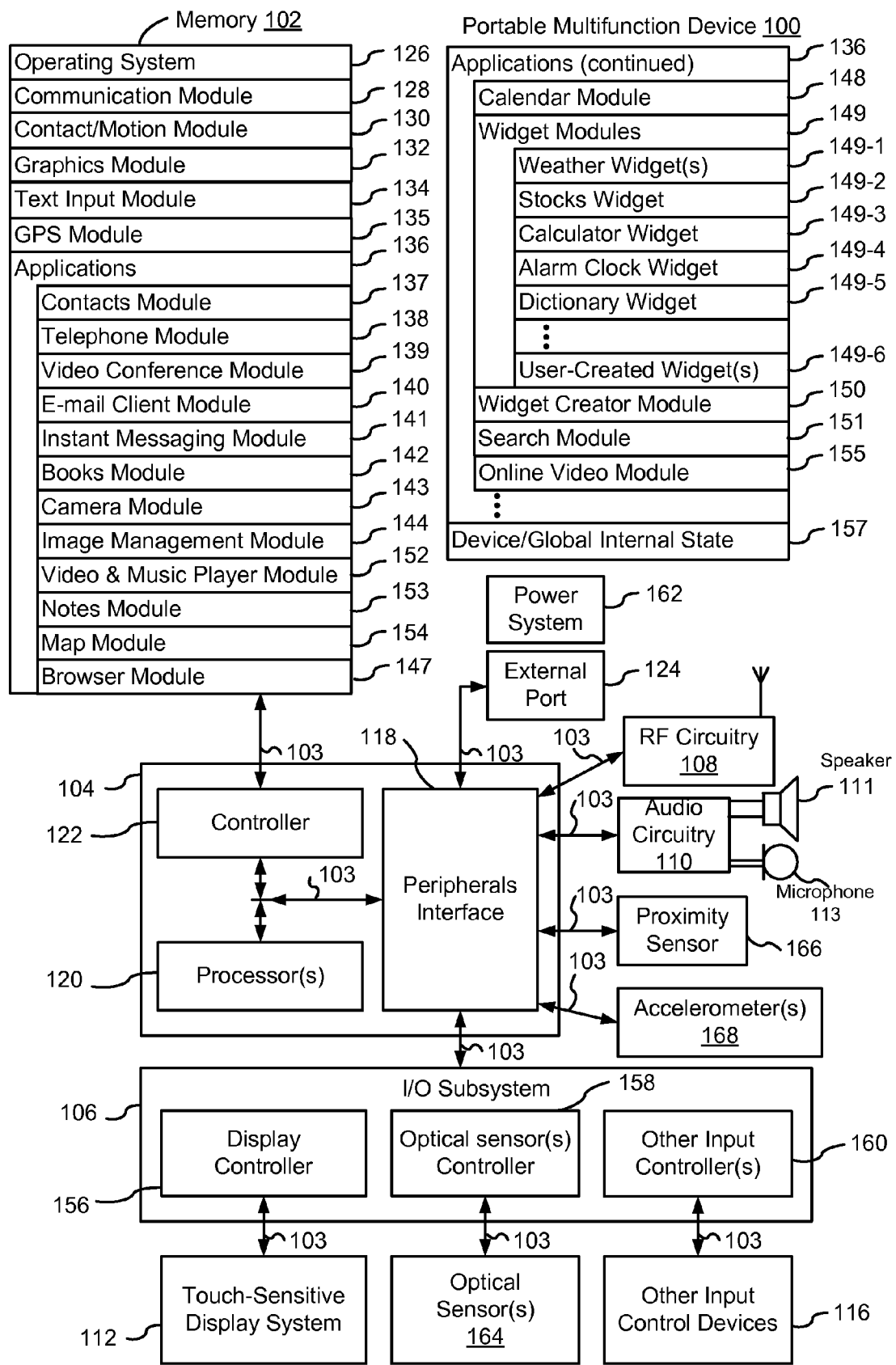
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive displays 112 in accordance with some embodiments. Touch-sensitive display 112 is sometimes called a "touch screen" for convenience, and may also be known as or called a touch-sensitive display system. Device 100 may include memory 102 (which may include one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 may include one or more optical sensors 164. These components may communicate over one or more communication buses or signal lines 103.

It should be appreciated that device 100 is only one example of a portable multifunction device, and that device 100 may have more or fewer components than shown, may combine two or more components, or may have a different configuration or arrangement of the components. The various components shown in FIG. 1A may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116. The other input control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of speaker 111 and/or microphone 113. The one or more buttons may include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIG. 1A shows an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, another optical sensor is located on the front of the device so that the user's image may be obtained for videoconferencing while the user views the other video conference participants on the touch screen display.

Device 100 may also include one or more proximity sensors 166. FIG. 1A shows proximity sensor 166 coupled to peripherals interface 118. Alternately, proximity sensor 166 may be coupled to input controller 160 in I/O subsystem 106. In some embodiments, the proximity sensor turns off and disables touch screen 112 when the multifunction device is placed near the user's ear (e.g., when the user is making a phone call).

Device 100 may also include one or more accelerometers 168. FIG. 1A shows accelerometer 168 coupled to peripherals interface 118. Alternately, accelerometer 168 may be coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
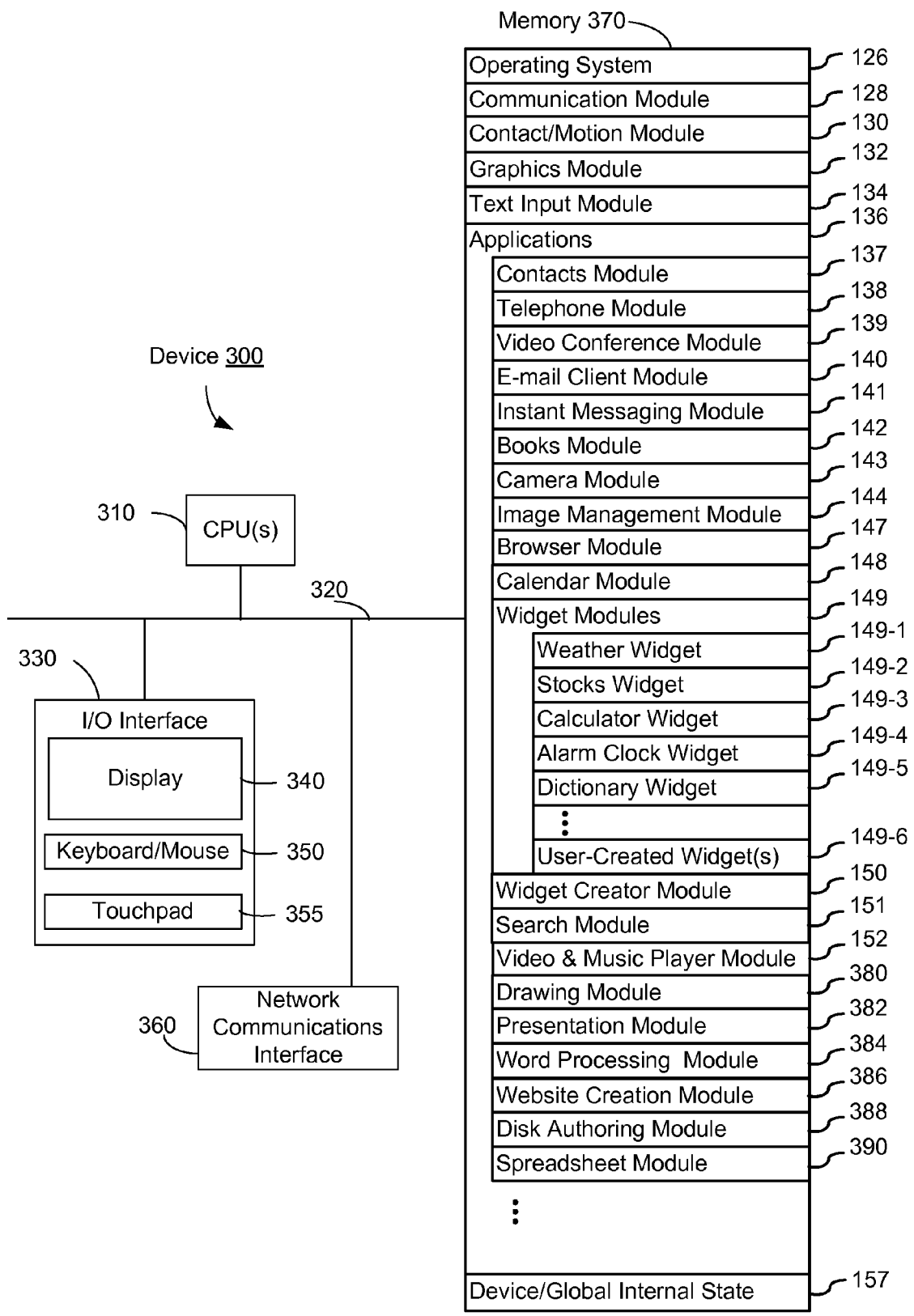
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 may detect contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 130 and display controller 156 detect contact on a touchpad.

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:
- contacts module 137 (sometimes called an address book or contact list);
- telephone module 138;
- video conferencing module 139;
- e-mail client module 140;
- instant messaging (IM) module 141;
- books module 142;
- camera module 143 for still and/or video images;
- image management module 144;
- browser module 147;
- calendar module 148;
- widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which may be made up of a video player module and a music player module;
- notes module 153;
- map module 154; and/or
- online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, books module 142 includes executable instructions to display, annotate, and share an electronic book (e.g., a text book), magazine, newspaper or other digital publication between a user and one or more other participants in accordance with user instructions.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 may include the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that may be performed exclusively through a touch screen and/or a touchpad include navigation between user interfaces. In some embodiments, the touchpad, when touched by the user, navigates device 100 to a main, home, or root menu from any user interface that may be displayed on device 100. In such embodiments, the touchpad may be referred to as a "menu button." In some other embodiments, the menu button may be a physical push button or other physical input control device instead of a touchpad.

FIG. 1C is a block diagram illustrating exemplary components for event handling in accordance with some embodiments. In some embodiments, memory 102 (in FIGS. 1A and 1B) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens, e.g., coordinating mouse movement and mouse button presses with or without single or multiple keyboard presses or holds, user movements taps, drags, scrolls, etc., on touch-pads, pen stylus inputs, movement of the device, oral instructions, detected eye movements, biometric inputs, and/or any combination thereof, which may be utilized as inputs corresponding to sub-events which define an event to be recognized.

Figure 2:
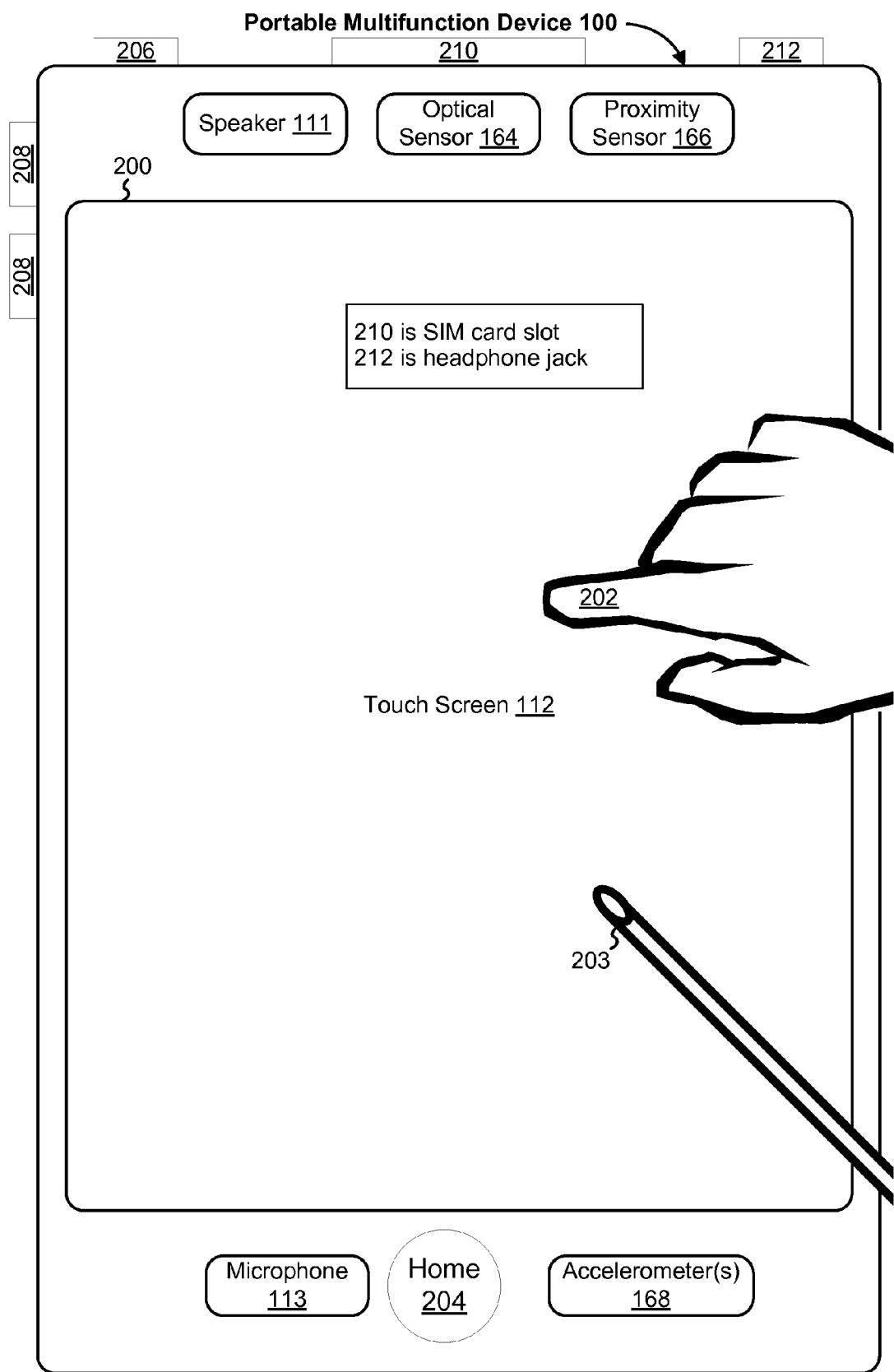
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture may include one or more taps, one or more swipes (from left to right, right to left, upward and/or downward) and/or a rolling of a finger (from right to left, left to right, upward and/or downward) that has made contact with device 100. In some embodiments, inadvertent contact with a graphic may not select the graphic. For example, a swipe gesture that sweeps over an application icon may not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also may accept verbal input for activation or deactivation of some functions through microphone 113.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 may include circuitry (sometimes called a chipset) that interconnects and controls communications between system components. Device 300 includes input/output (I/O) interface 330 comprising display 340, which is typically a touch screen display. I/O interface 330 also may include a keyboard and/or mouse (or other pointing device) 350 and touchpad 355. Memory 370 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 370 may optionally include one or more storage devices remotely located from CPU(s) 310. In some embodiments, memory 370 stores programs, modules, and data structures analogous to the programs, modules, and data structures stored in memory 102 of portable multifunction device 100 (FIG. 1), or a subset thereof. Furthermore, memory 370 may store additional programs, modules, and data structures not present in memory 102 of portable multifunction device 100. For example, memory 370 of device 300 may store drawing module 380, presentation module 382, word processing module 384, website creation module 386, disk authoring module 388, and/or spreadsheet module 390, while memory 102 of portable multifunction device 100 (FIG. 1) may not store these modules.

Each of the above identified elements in FIG. 3 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 370 may store a subset of the modules and data structures identified above. Furthermore, memory 370 may store additional modules and data structures not described above.

Attention is now directed towards embodiments of user interfaces ("UI") that may be implemented on portable multifunction device 100.

Figure 4A:
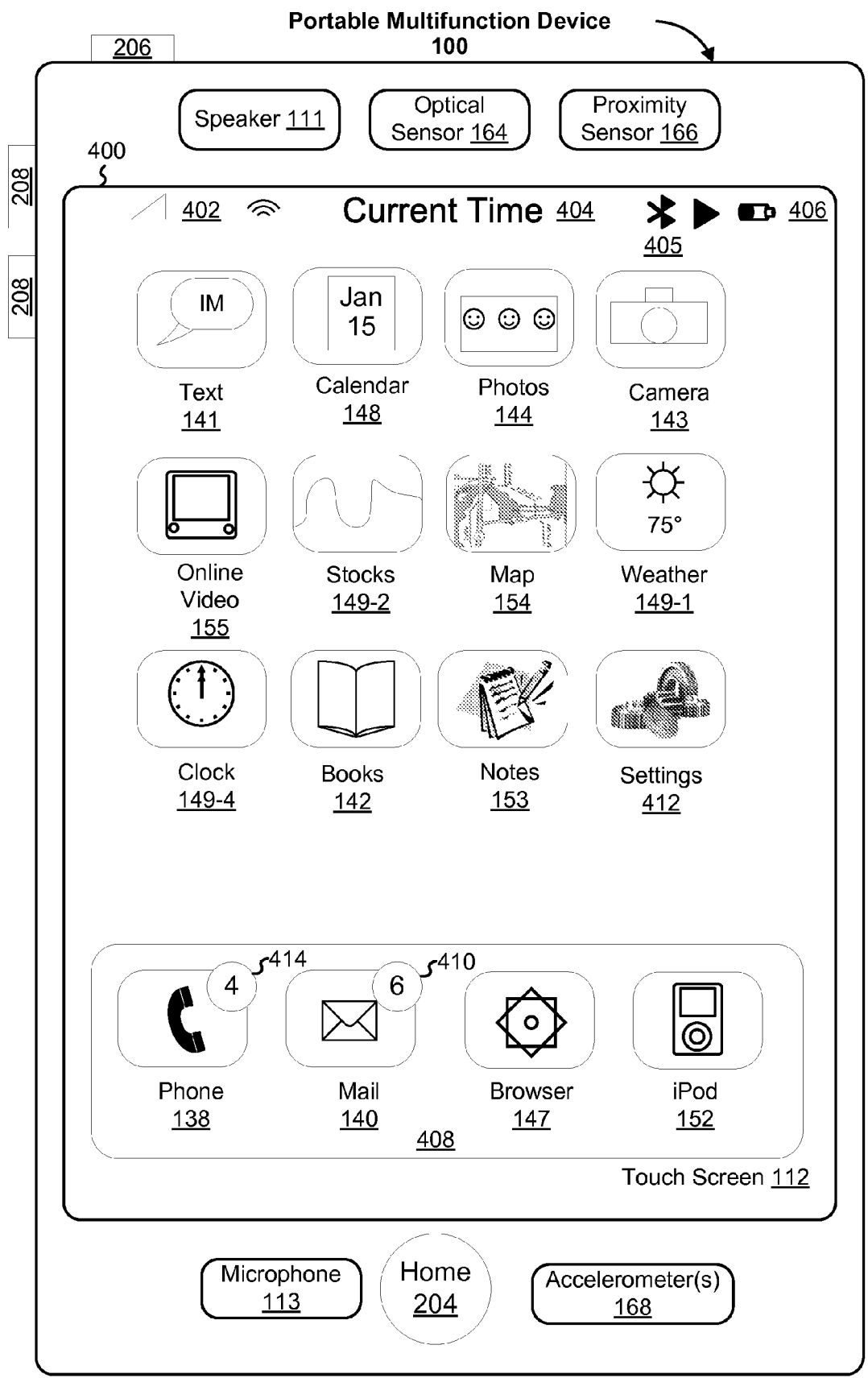
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces may be implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
Phone 138, which may include an indicator 414 of the number of missed calls or voicemail messages;
E-mail client 140, which may include an indicator 410 of the number of unread e-mails;

Browser 147; and

Video and music player 152, also referred to as iPod (trademark of Apple Inc.) module 152; and Icons for other applications, such as:
  IM 141;
  Image management 144;
  Camera 143;
  Weather 149-1;
  Stocks 149-2;
  Books 142;
  Calendar 148;
  Alarm clock 149-4;
  Map 154;
  Notes 153;
  Settings 412, which provides access to settings for device 100 and its various applications 136; and
  Online video module 155, also referred to as YouTube (trademark of Google Inc.) module 155.

Figure 4B:
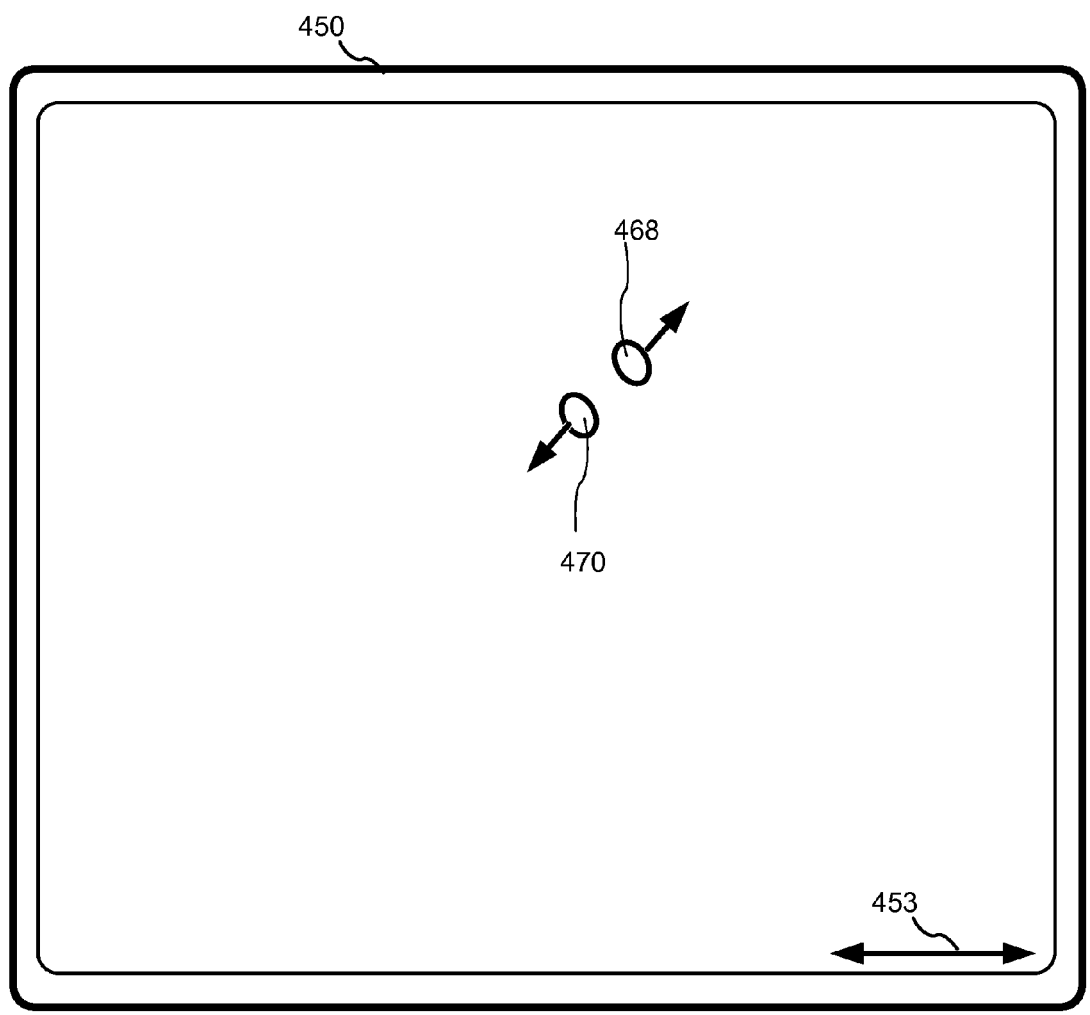
FIG. 4B illustrates an exemplary user interface for a multifunction device with a touch-sensitive surface that is separate from the display in accordance with some embodiments.
Figure 4B:
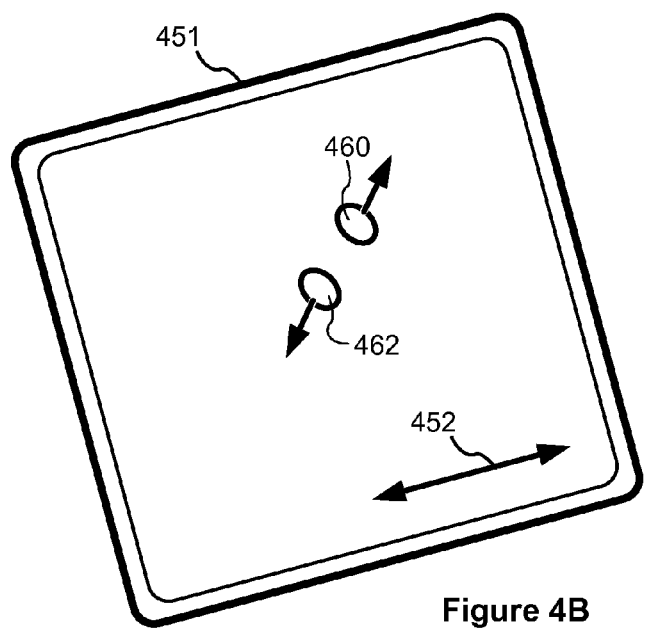

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Although many of the examples which follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments the touch sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods may be used for other user interfaces described herein.

User Interfaces and Associated Processes

Attention is now directed towards embodiments of user interfaces ("UI") and associated processes that may be implemented on an electronic device with a display and a touch-sensitive surface, such as device 300 or portable multifunction device 100.

FIGS. 5A-5C illustrate exemplary user interfaces for navigation and annotation of electronic documents in accordance with some embodiments. The user interfaces in these figures are used to illustrate the processes described below, including the processes in FIGS. 7A-7D and FIG. 8.

FIG. 5A illustrates an exemplary user interface displaying a portion of an electronic document 502-1 on touch screen display 112. FIG. 5A also illustrates gestures with exemplary finger contacts (e.g., 505, 507, 509, 511, 513, 515, 517, and 519) detected on touch screen display 112. It should be noted that the exemplary finger contacts (e.g., 505, 507, 509, 511, 513, 515, 517, and 519) do not need to be detected simultaneously. Indeed, the exemplary finger contacts are typically detected separately (i.e., when finger contact 505 is detected, typically none of finger contacts 507, 509, 511, 513, 515, 517, and 519 are simultaneously detected with finger contact 505).

The exemplary finger contacts include finger contact 505 that is part of a single finger swipe-gesture (e.g., a right-swipe gesture). As illustrated, finger contact 505 is detected at a location that corresponds to text of the displayed electronic document 502-1, in particular, at a location that corresponds to a beginning of the word "our."

In FIG. 5A, the user interface also indicates that the displayed portion of the electronic document 502-1 corresponds to page 4 of the electronic document.

FIG. 5B illustrates an exemplary user interface displaying the portion of the electronic document 502-1 on touch screen display 112 after a gesture made with a finger contact (e.g., 505, 507, or 509) is performed. The portion of the electronic document 502-1 in FIG. 5B includes annotation information, such as highlights 510-1, 510-2, and 510-3. As used herein, the term highlight refers to a visually emphasis of a portion of text, such as a different background color, an underline, a text with a different color, an italicized text, and/or a text with bold font. The respective highlights 510-1, 510-2, and 510-3 are displayed in response to respective corresponding gestures illustrated in FIG. 5A. For example, FIG. 5B illustrates that, in response to detecting a gesture with movement of finger contact 505 from 505-A to 505-B, highlight 510-1 is added to the displayed portion of the electronic document 502-1, in particular, to a portion that corresponds to the movement of finger contact 505 from 505-A to 505-B (e.g., "our fathers"). In some embodiments, finger contact 505 may move further (e.g., move toward the right-side of the figure along the first line of text in the displayed portion of the electronic document 502-2), and highlight 510-1 may expand to include one or more additional words (e.g., "brought").

Returning to FIG. 5A, finger contact 507, which is part of a single finger right-swipe gesture, is detected at a location that corresponds to one or more key words or a key phrase (e.g., "all men are created equal"). The one or more key words are typically pre-selected words (by an author, publisher, or user). Similarly, a key phrase is typically a pre-selected phrase. As illustrated, the key phrase and key words (e.g., "civil war") may be visually emphasized with bold text. FIG. 5B illustrates that, in some embodiments, in response to detecting a gesture with movement of finger contact 507 from 507-A to 507-B, highlight 510-2 is added to the displayed portion of the electronic document 502-1, in particular to a portion that corresponds to the movement of finger contact 507 from 507-A to 507-B (e.g., "all men"). In some embodiments, highlight 510-2 is added regardless of whether location 507-A corresponds to a beginning or a middle of the word "all," as long as location 507-A corresponds to a word in the one or more key words or the key phrase.

Returning to FIG. 5A, the exemplary finger contacts include finger contact 509 that is part of a single finger right-swipe gesture. Finger contact 509 is detected at a location that corresponds to a beginning of a sentence and a beginning of a paragraph. FIG. 5B illustrates that, in some embodiments, in response to detecting a gesture with movement of finger contact 509 from 509-A to 509-B, highlight 510-3 is added to the displayed portion of the electronic document 502-1, in particular, to a portion of text that corresponds to the movement of finger contact 509 from 509-A to 509-B (e.g., "Now we are engaged in"). In some embodiments, in response to detecting a gesture with movement of finger contact 509 from 509-A to 509-B, another portion of the electronic document 502-2 is displayed on touch screen 112 (e.g., a prior portion of the electronic document (such as a preceding page 3, not shown) when the speed of the movement of finger contact 509 exceeds a predefined speed threshold).

Also illustrated in FIG. 5A is finger contact 511 that is part of a single finger left-swipe gesture. Finger contact 511 is detected at a location that corresponds to a beginning of a sentence and a beginning of a paragraph. In some embodiments, in response to detecting a gesture with the leftward movement of finger contact 511, a navigation operation is performed, and as illustrated in FIG. 5C, the next portion of the electronic document 502-2 is displayed on touch screen 112 (e.g., page 4 in FIG. 5A is replaced by page 5 in FIG. 5C).

Returning to FIG. 5A, finger contact 513, which is part of a single finger right-swipe gesture, is detected at a location that corresponds to an area between paragraphs, with no text. In some embodiments, in response to detecting the right-swipe gesture that includes finger contact 513, a previous portion of the electronic document is displayed (e.g., page 3, not shown).

FIG. 5A also illustrates finger contact 515, which is part of a single-finger left-swipe gesture at a location that corresponds to a margin of the displayed portion of the electronic document 502-1. In some embodiments, in response to detecting the left-swipe gesture that includes finger contact 515, the next portion of the electronic document 502-2 is displayed (e.g., page 5 in FIG. 5C).

The exemplary finger contacts illustrated in FIG. 5A include finger contact 517 that is detected at a location that corresponds to a location between two lines of text. In some embodiments, in response to detecting the gesture that includes finger contact 517, a previous portion of the electronic document is displayed (e.g., page 3, not shown).

FIG. 5A also illustrates finger contact 519, which is part of a single-finger left-swipe gesture, is detected on touch screen 112. Finger contact 519 is detected at a location that corresponds to an end of a word, a sentence, or a paragraph. In some embodiments, in response to detecting a left-swipe gesture that includes finger contact 519, the next portion of the electronic document 502-2 is displayed (e.g., page 5 in FIG. 5C). In some embodiments, in response to detecting a left-swipe gesture that includes finger contact 519, a portion of the displayed text (e.g., "do this") is highlighted instead of displaying the next portion of the electronic document (not shown).

FIG. 6 illustrates exemplary functions representing movements of respective finger contacts in respective gestures in accordance with some embodiments. In FIG. 6, the movements of finger contacts (e.g., 505, FIG. 5A) are illustrated as functions of d (a distance between an initial position and a subsequent position of a finger contact, such as a distance between 505-A and 505-B) over time (represented as t) in plot 600. Such functions are illustrated as lines in FIG. 6. However, it should be noted that the lines in FIG. 6 are not drawn to scale.

Plot 600 includes lines 620-$a$ and 620-$b$ representing two values (e.g., two speeds) of a dynamic disambiguation threshold. The dynamic disambiguation threshold may initially have a default value (e.g., a speed corresponding to the slope of line 620-$a$), and later adjust to an increased value (e.g., a speed corresponding to the slope of line 620-$b$). Conversely, the dynamic disambiguation threshold may initially have a different default value (e.g., the speed corresponding to the slope of line 620-$b$) and later adjust to a decreased value (e.g., the speed corresponding to the slope of line 620-$a$).

Plot 600 includes line 602 representing a movement of a finger contact at a speed below a first threshold (e.g., the slope of line 620-$a$). The slope of line 602 represents the speed of the movement of the finger contact, and the slope of line 602 is less steep than the slope of threshold line 620-$a$. Line 602 represents a slow movement of a finger contact.

Plot 600 also includes line 604 representing a movement of a finger contact at a speed above the first threshold (e.g., the slope of line 620-$a$) but below a second threshold (e.g., the slope of line 620-$b$). The slope of line 604 is steeper than the slope of line 620-$a$, and less steep than the slope of line 620-$b$. Line 604 represents a moderate movement speed of a finger contact.

Also illustrated in plot 600 is line 606, which represents a movement of a finger contact at a speed above the second threshold (e.g., the slope of line 620-$b$). The slope of line 606 is steeper than the slope of line 620-$b$. Line 606 represents a fast movement speed of a finger contact.

FIG. 6 also illustrates line 608 which represents a delayed movement of a finger contact. For line 608, a finger contact is initially detected on touch screen 112 without a substantial movement of the finger contact (e.g., less than 0.3, 0.5, or 1.0 cm) for a duration (e.g., $t_d$). Thereafter, a movement of the finger contact is detected on touch screen 112. Line 608 represents a typical movement of a finger contact for an annotation operation in an electronic document, where a user typically makes a careful initial contact at a particular location in the text and then starts to move the contact over the text to be highlighted. In contrast, during a navigation operation, such as a swipe gesture to change the page in an electronic document, the initial contact is typically already moving (at t=0) because careful placement of the finger is not needed. In some cases, a flicking movement (e.g., a short burst with an accelerated movement) of a finger contact is used for a navigation operation in an electronic document.

FIGS. 7A-7D are flow diagrams illustrating method 700 of using a dynamic disambiguation threshold to interpret a gesture in accordance with some embodiments. Method 700 is performed at an electronic device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 700 may be combined and/or the order of some operations may be changed.

As described below, method 700 provides a more accurate way to interpret a gesture. The method reduces the cognitive burden on a user when providing user gestures on a touch-sensitive surface, thereby creating a more efficient human-machine interface. For battery-operated electronic devices, interpreting user gestures more efficiently and more accurately conserves power and increases the time between battery charges.

In some embodiments, the device displays an electronic document on the display (e.g., a portion of an electronic document 502-1, FIG. 5A). In some embodiments, the electronic document includes a plurality of document pages, and a respective portion of the electronic document corresponds to a respective document page. In some embodiments, a respective portion of the electronic document corresponds to a portion of a respective document page (but not the entire respective document page). In some embodiments, the electronic document is a continuous, scrollable document, with or without page breaks.

The device detects (702) a first portion of a gesture (e.g., an initial portion of the gesture). For example, the device detects one of: finger contacts 505, 507, 509, 511, 513, 515, 517, and 519 (FIG. 5A).

The device determines (704) that the first portion of the gesture has a first gesture characteristic (e.g., a location, predefined displacement/velocity/acceleration curve, direction, or speed). In some embodiments, the device determines that a finger contact is detected at a location that does not correspond to any text (e.g., 513 or 515, FIG. 5A). For example, the device may determine that a finger contact is detected at a location between two paragraphs (e.g., 513, FIG. 5A), or at a location that corresponds to a margin of the displayed portion of the electronic document (e.g., 515, FIG. 5A). In some embodiments, the device determines that a finger contact is detected at a location that corresponds to a respective word (e.g., 505, 507, 509, 511, or 519, FIG. 5A). In some embodiments, the device determines that a finger contact is detected at a location that corresponds to a first word of a respective sentence (e.g., 509 or 511, FIG. 5A). In some embodiments, the device determines that a finger contact is detected at a location that corresponds to a last word of a sentence (e.g., 519, FIG. 5A). In some embodiments, the device determines that a finger contact is detected at a location that corresponds to the beginning of a respective word. For example, the finger contact 505 is detected at a location that corresponds to the beginning of the word "our," and the finger contact 511 is detected at a location that corresponds to the beginning of the word "Four." In some embodiments, the device determines that a finger contact is detected at a location that corresponds to a first word of a key phrase. For example, the finger contact 507 is detected at a location that corresponds to the first word of the phrase "all men are created equal." In some embodiments, the device determines that a finger contact is detected at a location between two lines of text (e.g., 517, FIG. 5A).

In some embodiments, a user interface that includes at least a portion of an electronic document (e.g., a book, a word processing document, a spreadsheet, a slideshow document, a webpage, etc.) is displayed (706, FIG. 7B) on the display. Determining whether the first portion of the gesture has a first gesture characteristic includes determining whether the first portion of the gesture is detected at a location on the touch-sensitive surface that corresponds to a navigation preferred region of the displayed user interface (e.g., a margin of the displayed portion of the electronic document, as compared to a location that corresponds to an annotation preferred region of the displayed user interface, such as text of the electronic document). Navigation preferred regions are initial contact locations (e.g., margins and other locations without text or other content) that are more likely to correspond to navigation gestures (e.g., page turning or scrolling) rather than annotation gestures (e.g., highlighting). Conversely, annotation preferred regions are initial contact locations (e.g., locations that include text or particular types of text) that are more likely to correspond to annotation gestures rather than navigation gestures.

In some embodiments, the electronic document includes (708) content (e.g., text, images, figures, annotations, etc.), and the navigation preferred regions are regions that exclude content of the electronic document. For example, margins of the document (e.g., a location corresponding to finger contact 515, FIG. 5A) are navigation preferred regions.

In some embodiments, the electronic document includes (710) a plurality of paragraphs of text, and the navigation preferred regions are regions that are defined in accordance with locations of the plurality of paragraphs in the displayed user interface. For example, spaces between paragraphs (e.g., a location corresponding to finger contact 513, FIG. 5A).

In some embodiments, the electronic document includes (712) a plurality of lines of text, and the navigation preferred regions are regions that are defined in accordance with locations of the plurality of lines of text in the displayed user interface (e.g., spaces between the lines of the document are navigation preferred regions, such as a location corresponding to finger contact 517, FIG. 5A).

In some embodiments, a user interface that includes at least a portion of an electronic document (e.g., a book, a word processing document, a spreadsheet, a slideshow document, a webpage, etc.) is displayed (714) on the display, and determining whether the first portion of the gesture has a first gesture characteristic includes determining whether the first portion of the gesture is detected at a location on the touch-sensitive surface that corresponds to an annotation preferred region of the displayed user interface (as compared to the navigation preferred region described above).

In some embodiments, the electronic document includes (716) a plurality of words having a grammatical structure, and the annotation preferred regions are regions that are defined in accordance with the grammatical structure of the electronic document (e.g., the beginnings of clauses, sentences, paragraphs and other features identified by punctuation are annotation preferred regions). For example, locations corresponding to finger contacts 509 and 511, the beginnings of sentences and/or the beginnings of paragraphs, are annotation preferred regions. As another example, a location corresponding to finger contact 507, a beginning of a clause or phrase, is an annotation preferred region.

In some embodiments, the electronic document includes (718) a plurality of words, and the annotation preferred regions are regions that are defined in accordance with locations of the plurality words in the displayed user interface (e.g., the beginnings of words are annotation preferred regions). For example, locations corresponding to finger contacts 505 and 511 are the beginnings of words (FIG. 5A).

In some embodiments, the electronic document includes (720) a plurality of terms including one or more emphasized terms, and the annotation preferred regions are regions that are defined in accordance with locations of the emphasized terms in the displayed user interface (e.g., bullet points, bolded text, etc. are annotation preferred regions). For example, a location corresponding to finger contact 507 (FIG. 5A), which has emphasized terms (e.g., bolded text) "all men are created equal," is an annotation preferred region.

In some embodiments, determining whether the first portion of the gesture has a first gesture characteristic includes (722, FIG. 7C) determining whether the first portion of the gesture has a speed that is greater than a predefined speed threshold. For example, when a user tries to navigate to a next portion of the electronic document, the gesture may have an initial speed that is greater than the predefined speed threshold (e.g., line 606 in FIG. 6 has an initial speed that is greater than the speed threshold 620). In contrast, when the user tries to annotate, the gesture may be slow (e.g., line 602, FIG. 6) or initially relatively stationary as the user tries to carefully select the word to annotate (e.g., line 608 with an initial speed that is less than the speed threshold 620-*a*).

In some embodiments, determining whether the first portion of the gesture has a first gesture characteristic includes (724) determining whether the first portion of the gesture has acceleration that is greater than a predefined acceleration threshold. For example, when the user tries to navigate to the next portion of the electronic document, the gesture may have acceleration that is greater than the predefined acceleration threshold. In contrast, when the user tries to annotate, the gesture may have little or no acceleration (e.g., lines 602 in FIG. 6 has an initial acceleration that is less than the acceleration threshold).

In some embodiments, determining whether the first portion of the gesture has a first gesture characteristic includes determining whether the first portion of the gesture has a speed that is greater than the predefined speed threshold and acceleration that is greater than the predefined acceleration threshold.

In some embodiments, determining whether the first portion of the gesture has a first gesture characteristic includes (726) determining whether the first portion of the gesture includes movement of a contact that matches a predefined movement profile. For example, the predefined movement profile is a curve that corresponds to a change in displacement/velocity/acceleration over time (e.g., lines 602, 604, 606, and 608 in FIG. 6), and the movement matches the predefined movement profile when the rate of change of displacement/velocity/acceleration of the contact on the touch-sensitive surface over time is within 10% or 20% of the displacement/velocity/acceleration defined by the predefined movement profile. In some embodiments, determining whether the first portion of the gesture includes movement of a contact that matches a predefined movement profile includes determining whether the first portion of the gesture includes an initial pause of at least a predefined duration (e.g., $t_d$ for line 608, FIG. 6).

In some embodiments, determining whether the first portion of the gesture has the first gesture characteristic includes (728) determining whether the first portion of the gesture has a component of movement in a predefined direction (e.g., to the right, left, or downwards).

In some embodiments, the first type of operation is (730) a navigation operation, and the second type of operation is an annotation operation. A user interface including at least a portion of a document that includes text is displayed on the display, and the predefined direction is a reading direction for the text (e.g., a primary reading direction, such as left-to-right for English text, right-to-left for Hebrew text, and top-to-bottom for traditional Japanese text). In accordance with a determination that the first portion of the gesture has a component of movement in the predefined direction, the dynamic disambiguation threshold is adjusted to increase the range of values (e.g., speed values, acceleration, pause, etc.) that correspond to the annotation operation. In other words, if a gesture is detected that has a component of movement in the reading direction, the dynamic disambiguation threshold is adjusted to increase the likelihood that the gesture will be interpreted as an annotation gesture (e.g., because users are more likely to annotate in a reading direction). For example, as illustrated in FIG. 5A, the reading direction for the displayed English text is left-to-right. In response to detecting a left-to-right movement of finger contact 509, the speed threshold is adjusted to increase the range of values that correspond to the annotation operation (e.g., in FIG. 6, the slope of threshold line 620 is increased so that a wider range of speed corresponds to the annotation operation). Concurrently, in response to detecting a left-to-right movement of finger contact 509, the speed threshold is adjusted to decrease the range of values (e.g., speed values) that correspond to the navigation operation.

In some embodiments, in accordance with a determination that the first portion of the gesture has a component of movement in a direction that is opposite to the predefined direction, the dynamic disambiguation threshold is adjusted (732) to increase the range of values that correspond to the navigation operation. In other words, if a gesture is detected that has a component of movement opposite to the reading direction, the dynamic disambiguation threshold is adjusted to increase the likelihood that the gesture will be interpreted as a navigation gesture (e.g., because users are less likely to annotate in a direction that is opposite to the reading direction, and are thus more likely to be using the gesture to navigate through the document). For example, when the reading direction is left-to-right, in response to detecting a right-to-left movement of finger contact 519, the speed threshold is adjusted to decrease the range of values (e.g., speed values) that correspond to the annotation operation (e.g., in FIG. 6, the slope of threshold line 620 is decreased so that a narrower range of speed corresponds to the annotation operation). In some embodiments, the dynamic disambiguation threshold is adjusted so that an annotation operation will not be performed (e.g., by reducing the range of values that correspond to the annotation operation to an empty set). Concurrently, in response to detecting a right-to-left movement of finger contact 519, the speed threshold is adjusted to increase the range of values (e.g., speed values) that correspond to the navigation operation.

In some embodiments, the predefined direction is determined (734) in accordance with a language of the text (e.g., left-to-right for English text, right-to-left for Hebrew text, and top-to-bottom for traditional Japanese text).

In some embodiments, the first gesture characteristic is determined (736) in accordance with previous inputs detected by the device. In other words, the rules for defining navigation characteristics and annotation characteristics are learned from detected user behavior. For example, when a user performs multiple navigation operations with rapid movements of finger contacts (e.g., movements corresponding to line 606, FIG. 6), the speed threshold is increased above a default value in some embodiments (e.g., from line 620-*a* to line 620-*b*, FIG. 6). Similarly, other user behavior may be used to adjust the first gesture characteristic (e.g., a particular user always performs an annotation operation with an initial finger contact at a location that corresponds to a middle of a paragraph).

In response to determining that the first portion of the gesture has a first gesture characteristic, the device selects (738, FIG. 7A) a dynamic disambiguation threshold (e.g., speed and/or acceleration threshold) in accordance with the first gesture characteristic. The dynamic disambiguation threshold is used to determine whether to perform a first type of operation (e.g., a navigation operation) or a second type of operation (e.g., an annotation operation) when a first kind of gesture (e.g., a right-swipe gesture) is detected. As one example, the dynamic disambiguation threshold may include a speed threshold and/or an acceleration threshold selected in accordance with a location of the first portion of the gesture. In another example, the dynamic disambiguation threshold may include the speed threshold and the acceleration threshold selected in accordance with a speed of the first portion of the gesture.

In some embodiments, the device selects a high speed threshold when the first portion of the gesture is detected at an annotation preferred region of the displayed user interface. In some embodiments, the device selects a low speed threshold when the first portion of the gesture is detected at a navigation preferred region of the displayed user interface.

In some embodiments, the first kind of gesture is (740) a single contact swipe gesture. In some embodiments, the first kind of gesture is one of: a left-swipe gesture, a right-swipe gesture, a swipe-up gesture, and a swipe-down gesture. In some embodiments, the first kind of gesture is one of: a pinch gesture, a depinch gesture, a multi-contact swipe gesture, a single tap gesture, a multiple tap gesture.

In some embodiments, the dynamic disambiguation threshold is (742) a gesture speed threshold (e.g., the dynamic disambiguation threshold corresponds to a predefined speed of movement of the contact on the touch-sensitive surface during the gesture).

In some embodiments, the dynamic disambiguation threshold has (744) a default disambiguation value (e.g., the default disambiguation value is a default speed threshold for the movement of the contact).

The device determines (746) that the gesture is a gesture of the first kind of gesture. For example, the device determines that the gesture is a right-swipe gesture including a finger contact (e.g., 505, 507, 509, or 517). Alternatively, the gesture is determined to be one of: a left-swipe gesture; a swipe-up gesture; a swipe-down gesture; a pinch gesture; or a depinch gesture. In some embodiments, when the gesture is not a gesture of the first kind of gesture, the device processes the gesture without using the dynamic disambiguation threshold.

After selecting the dynamic disambiguation threshold, the device determines (748) whether the gesture meets the dynamic disambiguation threshold. In some embodiments, the device has a plurality of operational modes, including an annotation mode and a navigation mode, and the dynamic disambiguation threshold is used in only a subset of the operational modes. For example, the dynamic disambiguation threshold may be ignored when the device is in a navigation mode and used when the device is in an annotation mode.

In some embodiments, a second portion of the gesture is detected (750) after the first portion of the gesture (i.e., the second portion of the gesture is subsequent to the first portion of the gesture) and prior to determining that the gesture is a gesture of the first kind of gesture. The second portion of the gesture is used to determine whether the gesture meets the dynamic disambiguation threshold. For example, the first portion is a contact detected at an initial location on the touch-sensitive surface and the second portion includes subsequent movement of the contact on the touch-sensitive surface, and the dynamic disambiguation threshold is a speed threshold. Thus, the second portion of the gesture is used to determine a speed of the gesture, which enables the device to determine whether the speed of the gesture is greater than or less than the dynamic disambiguation threshold. For example, line 608 in FIG. 6 has a first portion that is substantially stationary, and a second portion that represents a movement at a respective speed, and the speed of the second portion may be used to determine whether the gesture meets the dynamic disambiguation threshold.

In accordance with a determination that the gesture meets the dynamic disambiguation threshold (e.g., a contact movement speed threshold), the device performs (752) the first type of operation in accordance with the gesture. For example, in response to detecting a swipe gesture that is faster than a speed threshold (e.g., line 604 in FIG. 6), the device navigates through a displayed electronic document. In some embodiments, when the swipe gesture is a left swipe gesture above the dynamic disambiguation threshold, the device displays a next portion (e.g., a next page) of the electronic document (e.g., page 5, FIG. 5C), and when the swipe gesture is a right swipe gesture above the dynamic disambiguation threshold, the device displays a previous portion (e.g., a previous page) of the electronic document.

In accordance with a determination that the gesture does not meet the dynamic disambiguation threshold, the device performs (754) the second type of operation in accordance with the gesture. For example, in response to detecting a swipe gesture that is slower than a speed threshold (e.g., line 602 in FIG. 6), the device adds highlighting to a portion of an electronic document in accordance with the gesture (e.g., highlight 510, FIG. 5B).

In some embodiments, the first type of operation is (756)) a navigation operation for an electronic document displayed on the display, and the second type of operation is an annotation operation for the electronic document. The first gesture characteristic is a navigation characteristic (e.g., the first portion of the gesture is located in a navigation preferred region, has a navigation preferred direction, etc.). In accordance with a determination that the gesture has the first gesture characteristic, the dynamic disambiguation threshold is adjusted to increase the range of values that correspond to the navigation operation. For example, when a finger contact is detected at a location that corresponds to a margin of a displayed portion of the electronic document (e.g., finger contact 515, FIG. 5A), the speed threshold (e.g., as illustrated by the slope of line 620, FIG. 6) is decreased to increase the range of speeds that corresponds to the navigation operation.

In some embodiments, a user interface that includes a current portion of the electronic document is displayed (758) on the display, and the navigation operation includes displaying a different portion of the electronic document in the user interface in accordance with the gesture. As one example, the device replaces the currently displayed page of the electronic document with a next page of the electronic document. In another example, the device scrolls a next portion of the electronic document in one or two dimensions.

In some embodiments, the first type of operation is (760) a navigation operation for an electronic document displayed on the display, and the second type of operation is an annotation operation for the electronic document. The first gesture characteristic is an annotation characteristic (e.g., that the first portion of the gesture is located in an annotated preferred region, or has an annotation preferred direction, etc.). In accordance with a determination that the gesture has the first gesture characteristic, the dynamic disambiguation threshold is adjusted to increase the range of values that correspond to annotation operation. For example, when a finger contact is detected at a location that corresponds to text of a displayed portion of the electronic document (e.g., finger contact 509, FIG. 5A), the speed threshold (e.g., as illustrated by the slope of line 620, FIG. 6) is increased to increase the range of speeds that corresponds to the annotation operation (e.g., from line 620-a to line 620-b, FIG. 6).

In some embodiments, a user interface that includes at least a portion of the electronic document having predefined content is displayed (762) on the display, and the annotation operation includes adding additional content to the predefined content. For example, a swipe over a line of text adds highlighting (or an underline) to the line of text. In some embodiments, information corresponding to annotations is stored in metadata for the document, and the method includes, in conjunction with adding a new annotation, modifying the information corresponding to the annotations that is stored in the metadata for the document to account for the new annotation. In other words, an annotation such as highlighting is not merely transient "selection" of a portion of the document. Rather, information corresponding to the annotation is stored in metadata for the document and is available for later use. Thus, storing the annotation in the metadata for the document allows closing and retrieving the document, and displaying the annotation stored in the metadata for the document. In some embodiments, the annotation is also referred to as a persistent annotation.

In some embodiments, the first type of operation navigates to a next or previous page of an electronic document, and the second type of operation navigates to a next or previous chapter of the electronic document. For example, a speed threshold is selected in accordance with an initial location of a finger contact. When a gesture includes movement of the finger contact at a speed below the speed threshold, the device navigates to a next or previous page of the electronic document. When the movement of the finger contact in the gesture has a speed above the speed threshold, the device navigates to a next or previous chapter of the electronic document.

In some embodiments the first type of operation navigates to a next or previous page of an electronic document, and the second type of operation navigates to a page that includes a table of contents for the electronic document. When a gesture includes movement of the finger contact at a speed below the speed threshold, the device navigates to a next or previous page of the electronic document. When the movement of the finger contact in the gesture has a speed above the speed threshold, the device navigates to the page that includes the table of contents.

In some embodiments, the gesture is a pinch gesture. In some embodiments, the first type of operation is a zoom-in operation, and the second type of operation is an annotation operation (e.g., annotating a portion of text between two finger contacts for the pinch gesture).

In some embodiments, the gesture is a depinch gesture. In some embodiments, the first type of operation is a zoom-out operation, and the second type of operation is an annotation operation (e.g., annotating a portion of text between two finger contacts for the pinch gesture, or expanding an area covered by an existing annotation).

Figure 8:
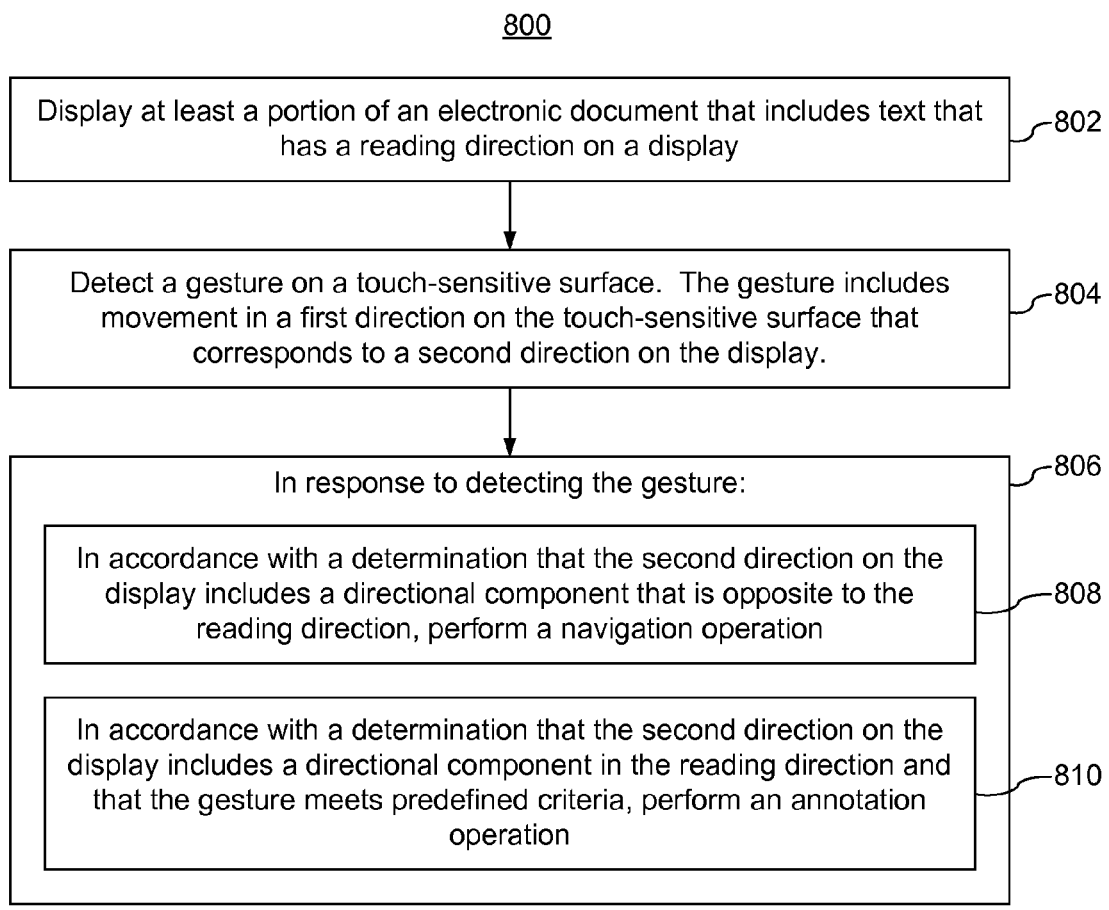
FIG. 8 is a flow diagram illustrating a method of interpreting a gesture as a navigation operation or an annotation operation for an electronic document in accordance with some embodiments.

FIG. 8 is a flow diagram illustrating method 800 of interpreting a gesture as a navigation gesture or an annotation gesture for an electronic document in accordance with some embodiments. Method 800 is performed at an electronic device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 800 may be combined and/or the order of some operations may be changed.

As described below, method 800 provides a more accurate and more efficient way to interpret a gesture as a navigation gesture or an annotation gesture for an electronic document. The method reduces the cognitive burden on a user when providing a gesture for a navigation operation or an annotation operation for an electronic document, thereby creating a more efficient human-machine interface. For battery-operated electronic devices, providing a more accurate and more efficient way to interpret a gesture as a navigation gesture or an annotation gesture conserves power and increases the time between battery charges.

The device displays (802) at least a portion of an electronic document (e.g., a book, a word processing document, a spreadsheet, a slideshow document, a webpage, etc.) that includes text that has a reading direction. For example, for English, the reading direction is left-to-right, and for Hebrew the reading direction is right-to-left. In FIG. 5A, the displayed portion 502-1 includes English text that has the left-to-right reading direction.

The device detects (804) a gesture (e.g., a swipe gesture) on the touch-sensitive surface. The gesture includes movement (of at least one finger contact) in a first direction on the touch-sensitive surface that corresponds to a second direction on the display (e.g., the direction for the movement of contact 460 on the touch-sensitive surface 451 corresponds to the direction of the corresponding location 468 on the display 450, FIG. 4B). In some embodiments, the first direction on the touch-sensitive surface is the same as the second direction on the display, such as when the display is a touch-sensitive display that includes the touch-sensitive surface.

In response to detecting the gesture (806), in accordance with a determination that the second direction on the display includes a directional component that is opposite to the reading direction, the device performs (808) a navigation operation (e.g., turning a page in the document or scrolling through the document to display a different portion of the document). As one example, when the direction of the movement is right-to-left (e.g., movement of a finger contact, such as one of 511, 515, and 519 on page 4, FIG. 5A), the device displays a next portion of the document (e.g., page 5, FIG. 5C). In another example, in response to detecting a diagonal left-up swipe, the device displays the next portion of the document 502-2, because the diagonal left-up swipe has a directional component (e.g., right-to-left) that is opposite to the reading direction (e.g., left-to-right). Thus, even when the direction of the swipe does not exactly align with the opposite of the reading direction, the device displays the next portion of the document (e.g., page 5, FIG. 5C).

Also in response to detecting the gesture (806), in accordance with a determination that the second direction on the display includes a directional component in the reading direction and that the gesture meets predefined criteria, the device performs (810) an annotation operation (e.g., highlighting text). In some embodiments, when the second direction has a directional component in the reading direction but the gesture does not meet predefined criteria, then a navigation operation is performed. The predefined criteria may be based on a location of the gesture, a speed of the gesture, etc. For example, in response to detecting a movement of finger contact 505 at a location that corresponds to text (FIG. 5A), the device performs an annotation operation (e.g., 510-1, FIG. 5B). In response to detecting a movement of finger contact 513 at a location that does not correspond to text (FIG. 5A), the device performs a navigation operation (e.g., displaying the next portion of the electronic document 502-3, FIG. 5C).

Note that details of other processes described herein with respect to method 700 are also applicable in an analogous manner to method 800. For example, the navigation operation and annotation operation described with reference to FIG. 8 may have one or more of the characteristics of the various navigation operations and annotation operations described herein with reference to method 700. For brevity, these details are not repeated here.

As described herein, the disambiguation is used for distinguishing the navigation operation and the annotation operation (e.g., highlighting). The disambiguation could also be used for distinguishing the navigation operation and a text selection operation.

The operations in the information processing methods described above may be implemented by running one or more functional modules in information processing apparatus such as general purpose processors or application specific chips. These modules, combinations of these modules, and/or their combination with general hardware (e.g., as described above with respect to FIGS. 1A and 3) are all included within the scope of protection of the invention.

Figure 1B:
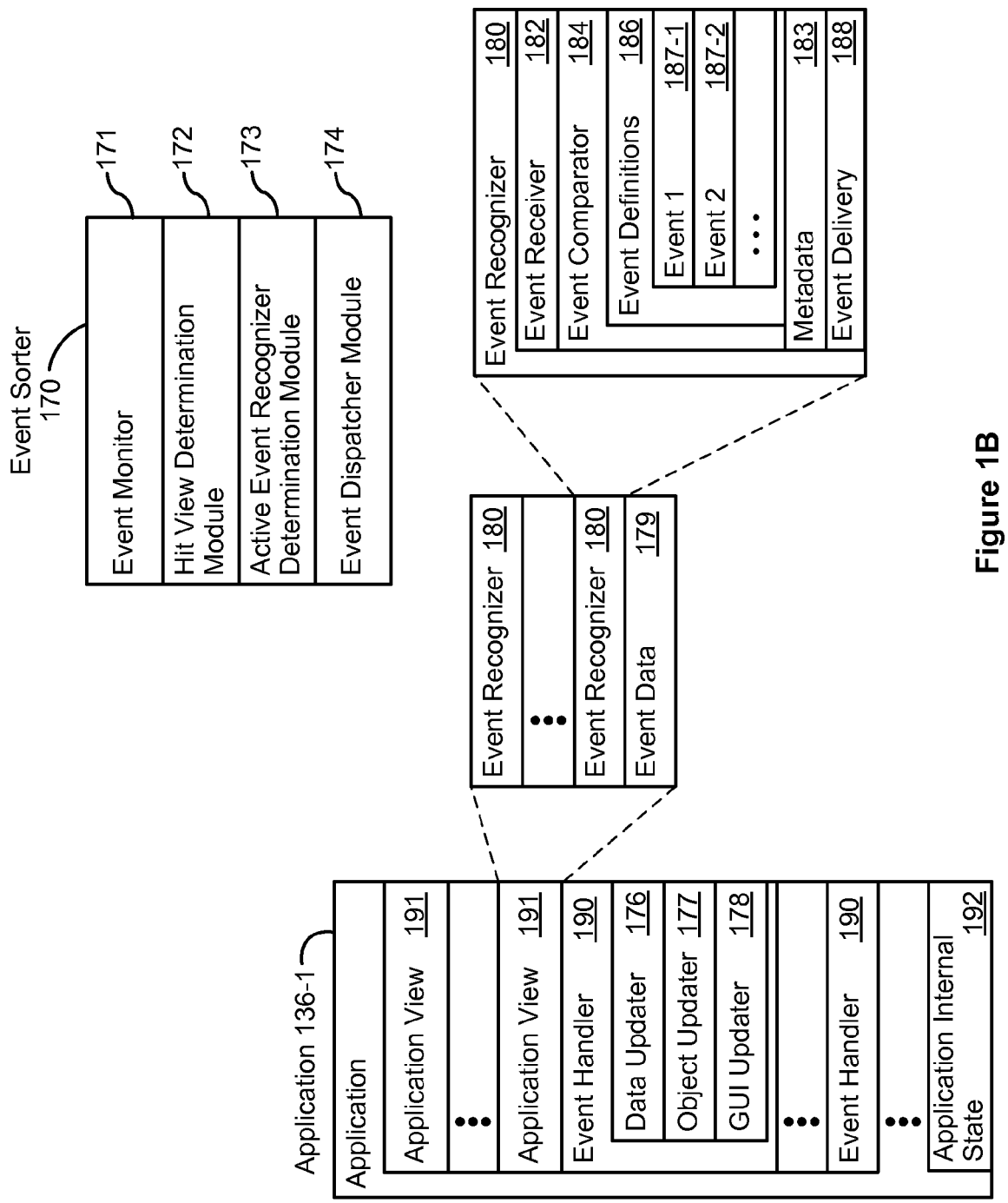
FIG. 1B is a block diagram illustrating exemplary components for event handling in accordance with some embodiments.

The operations described above with reference to FIGS. 7A-7D and FIG. 8 may be implemented by components depicted in FIGS. 1A-1B. For example, detection operation 702, selection operation 738, and performing operation 754 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 9:
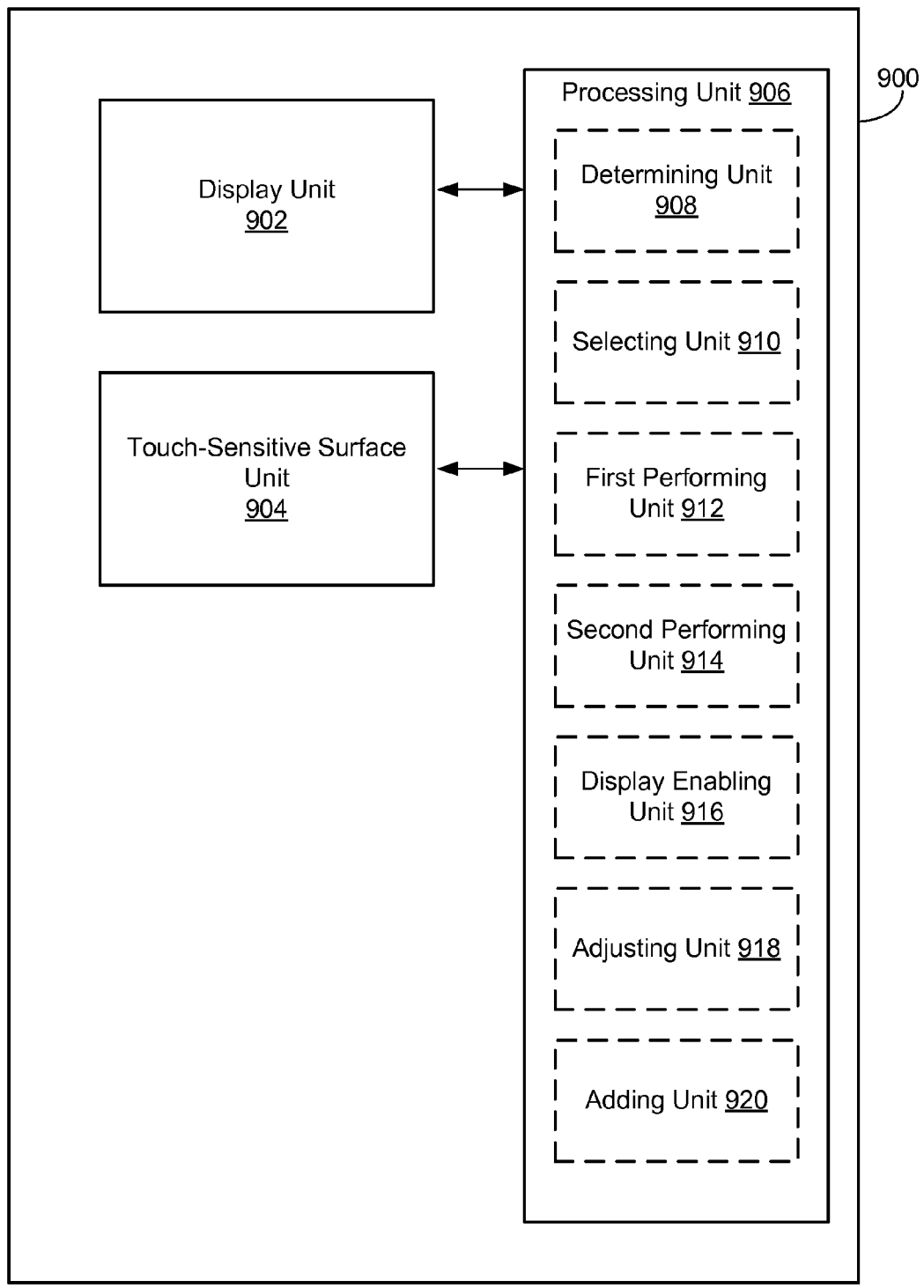
FIG. 9 is a functional block diagram of an electronic device in accordance with some embodiments.

In accordance with some embodiments, FIG. 9 shows a functional block diagram of an electronic device 900 configured in accordance with the principles of the invention as described above. The functional blocks of the device may be implemented by hardware, software, or a combination of hardware and software to carry out the principles of the invention. It is understood by persons of skill in the art that the functional blocks described in FIG. 9 may be combined or separated into sub-blocks to implement the principles of the invention as described above. Therefore, the description herein may support any possible combination or separation or further definition of the functional blocks described herein.

As shown in FIG. 9, an electronic device 900 includes a display unit 902; a touch-sensitive surface unit 904 configured to detect a first portion of a gesture; and a processing unit 906 coupled to the display unit 902 and the touch-sensitive surface unit 904. In some embodiments, the processing unit 906 includes a determining unit 908, a selecting unit 910, a first performing unit 912, a second performing unit 914, a display enabling unit 916, an adjusting unit 918, and an adding unit 920.

The processing unit 906 is configured to: determine that the first portion of the gesture has a first gesture characteristic (e.g., with the determining unit 908); in response to determining that the first portion of the gesture has a first gesture characteristic, select a dynamic disambiguation threshold in accordance with the first gesture characteristic (e.g., with the selecting unit 910), wherein the dynamic disambiguation threshold is used to determine whether to perform a first type of operation or a second type of operation when a first kind of gesture is detected on the touch-sensitive surface unit 904; determine that the gesture is a gesture of the first kind of gesture (e.g., with the determining unit 908); after selecting the dynamic disambiguation threshold, determine whether the gesture meets the dynamic disambiguation threshold (e.g., with the determining unit 908); in accordance with a determination that the gesture meets the dynamic disambiguation threshold, perform the first type of operation in accordance with the gesture (e.g., with the first performing unit 912); and in accordance with a determination that the gesture does not meet the dynamic disambiguation threshold, perform the second type of operation in accordance with the gesture (e.g., with the second performing unit 914).

In some embodiments, the first kind of gesture is a single contact swipe gesture.

In some embodiments, the dynamic disambiguation threshold is a gesture speed threshold.

In some embodiments, the dynamic disambiguation threshold has a default disambiguation value.

In some embodiments, a second portion of the gesture is detected (e.g., with the touch-sensitive surface unit 904) after the first portion of the gesture and prior to determining that the gesture is a gesture of the first kind of gesture; and the second portion of the gesture is used to determine (e.g., with the determining unit 908) whether the gesture meets the dynamic disambiguation threshold.

In some embodiments, the first type of operation is a navigation operation for an electronic document displayed on the display unit 902, and the second type of operation is an annotation operation for the electronic document. The first gesture characteristic is a navigation characteristic, and in accordance with a determination that the gesture has the first gesture characteristic, the dynamic disambiguation threshold is adjusted (e.g., with the adjusting unit 918) to increase the range of values that correspond to the navigation operation.

In some embodiments, a user interface that includes a current portion of the electronic document is displayed on the display unit 902; and the navigation operation includes enabling display of a different portion of the electronic document in the user interface in accordance with the gesture (e.g., with the display enabling unit 916).

In some embodiments, the first type of operation is a navigation operation for an electronic document displayed on the display unit 902, and the second type of operation is an annotation operation for the electronic document. The first gesture characteristic is an annotation characteristic, and in accordance with a determination that the gesture has the first gesture characteristic, the dynamic disambiguation threshold is adjusted (e.g., with the adjusting unit 918) to increase the range of values that correspond to the annotation operation.

In some embodiments, a user interface that includes at least a portion of the electronic document having predefined content is displayed on the display unit 902, and the annotation operation includes adding additional content to the predefined content (e.g., with the adding unit 920).

In some embodiments, a user interface that includes at least a portion of an electronic document is displayed on the display unit 902, and determining whether the first portion of the gesture has the first gesture characteristic includes determining (e.g., with the determining unit 908) whether the first portion of the gesture is detected at a location on the touch-sensitive surface unit 904 that corresponds to a navigation preferred region of the displayed user interface on the display unit 902.

In some embodiments, the electronic document includes content, and the navigation preferred regions are regions that exclude content of the electronic document.

In some embodiments, the electronic document includes a plurality of paragraphs of text, and the navigation preferred regions are regions that are defined in accordance with locations of the plurality of paragraphs in the displayed user interface.

In some embodiments, the electronic document includes a plurality of lines of text, and the navigation preferred regions are regions that are defined in accordance with locations of the plurality of lines of text in the displayed user interface.

In some embodiments, a user interface that includes at least a portion of an electronic document is displayed on the display unit 902, and determining whether the first portion of the gesture has a first gesture characteristic includes determining whether the first portion of the gesture is detected at a location on the touch-sensitive surface unit 904 that corresponds to an annotation preferred region of the displayed user interface.

In some embodiments, the electronic document includes a plurality of words having a grammatical structure, and the annotation preferred regions are regions that are defined in accordance with the grammatical structure of the electronic document.

In some embodiments, the electronic document includes a plurality of words; and the annotation preferred regions are regions that are defined in accordance with locations of the plurality words in the displayed user interface.

In some embodiments, the electronic document includes a plurality of terms including one or more emphasized terms, and the annotation preferred regions are regions that are defined in accordance with locations of the emphasized terms in the displayed user interface.

In some embodiments, determining whether the first portion of the gesture has the first gesture characteristic includes determining whether the first portion of the gesture has a speed that is greater than a predefined speed threshold.

In some embodiments, determining whether the first portion of the gesture has the first gesture characteristic includes determining whether the first portion of the gesture has acceleration that is greater than a predefined acceleration threshold.

In some embodiments, determining whether the first portion of the gesture has a first gesture characteristic includes determining whether the first portion of the gesture includes movement of a contact that matches a predefined movement profile.

In some embodiments, determining whether the first portion of the gesture has the first gesture characteristic includes determining whether the first portion of the gesture has a component of movement in a predefined direction.

In some embodiments, the first type of operation is a navigation operation, and the second type of operation is an annotation operation. A user interface including at least a portion of a document that includes text is displayed on the display unit 902. The predefined direction is a reading direction for the text. In accordance with a determination that the first portion of the gesture has a component of movement in the predefined direction, the dynamic disambiguation threshold is adjusted (e.g., with the adjusting unit 918) to increase the range of values that correspond to the annotation operation.

In some embodiments, in accordance with a determination that the first portion of the gesture has a component of movement in a direction that is opposite to the predefined direction, the dynamic disambiguation threshold is adjusted (e.g., with the adjusting unit 918) to increase the range of values that correspond to the navigation operation.

In some embodiments, the predefined direction is determined (e.g., with the determining unit 908) in accordance with a language of the text.

In some embodiments, the first gesture characteristic is determined (e.g., with the determining unit 908) in accordance with previous inputs detected by the device.

Figure 10:
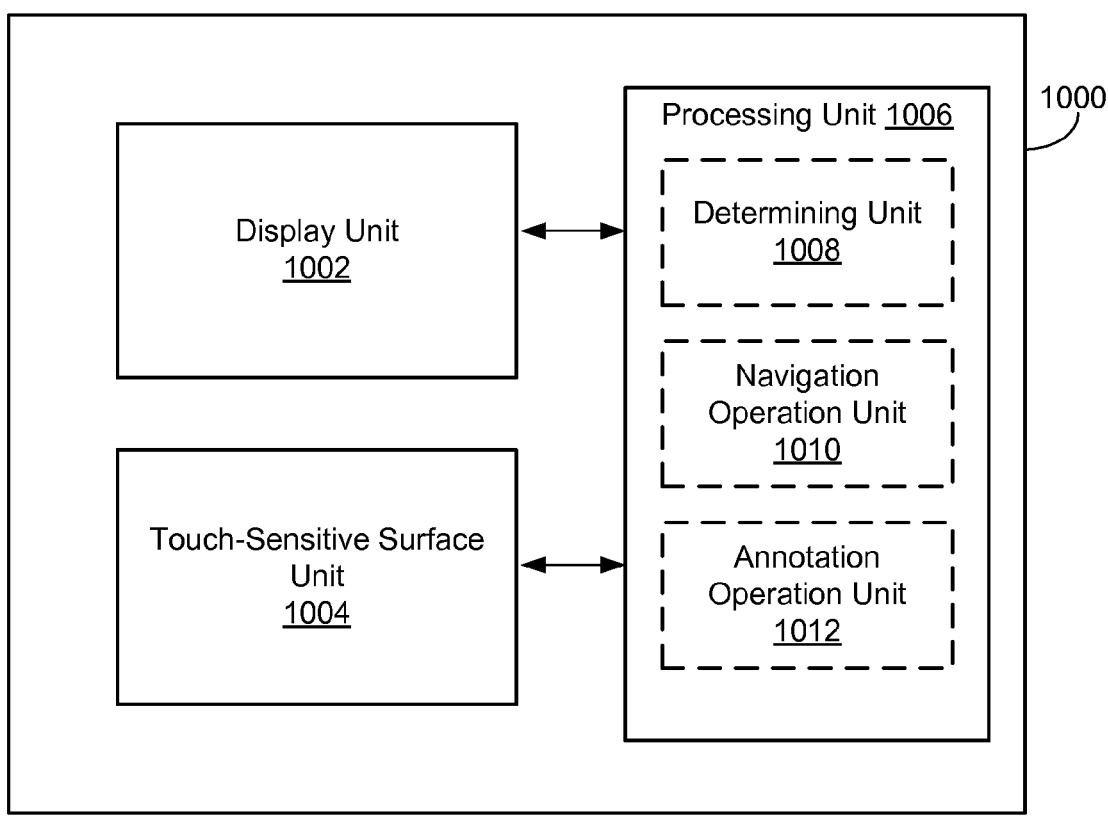
FIG. 10 is a functional block diagram of an electronic device in accordance with some embodiments.

In accordance with some embodiments, FIG. 10 shows a functional block diagram of an electronic device 1000 configured in accordance with the principles of the invention as described above. The functional blocks of the device may be implemented by hardware, software, or a combination of hardware and software to carry out the principles of the invention. It is understood by persons of skill in the art that the functional blocks described in FIG. 10 may be combined or separated into sub-blocks to implement the principles of the invention as described above. Therefore, the description herein may support any possible combination or separation or further definition of the functional blocks described herein.

As shown in FIG. 10, an electronic device 1000 includes a display unit 1002 configured to displaying at least a portion of an electronic document that includes text that has a reading direction on the display unit, and a touch-sensitive surface unit 1004 configured to detect a gesture. The gesture includes movement in a first direction on the touch-sensitive surface unit that corresponds to a second direction on the display unit 1002. The electronic device 1000 also includes a processing unit 1006 coupled to the display unit 1002 and the touch-sensitive surface unit 1004. In some embodiments, the processing unit 1006 includes a determining unit 1008, a navigation operation unit 1010, and an annotation operation unit 1012. The processing unit 1006 is configured to, in response to detecting the gesture: in accordance with a determination (e.g., with the determining unit 1008) that the second direction on the display unit 1002 includes a directional component that is opposite to the reading direction, perform a navigation operation (e.g., with the navigation operation unit 1010); and in accordance with a determination (e.g., with the determining unit 1008) that the second direction on the display unit 1002 includes a directional component in the reading direction and that the gesture meets predefined criteria, perform an annotation operation (e.g., with the annotation operation unit 1012).

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. An electronic device, comprising:
a display;
a touch-sensitive surface;
one or more processors;
memory; and
one or more programs, wherein the one or more programs are stored in the memory and configured to be executed by the one or more processors, the one or more programs including instructions for:
detecting a first portion of a gesture;
determining that the first portion of the gesture has a first gesture characteristic;
in response to determining that the first portion of the gesture has a first gesture characteristic, selecting a dynamic disambiguation threshold in accordance with the first gesture characteristic, wherein the dynamic disambiguation threshold is used to determine whether to perform a first type of operation or a second type of operation when a first kind of gesture is detected;
determining that the gesture is a gesture of the first kind of gesture;
after selecting the dynamic disambiguation threshold, determining whether the gesture meets the dynamic disambiguation threshold;
in accordance with a determination that the gesture meets the dynamic disambiguation threshold, performing the first type of operation in accordance with the gesture; and
in accordance with a determination that the gesture does not meet the dynamic disambiguation threshold, performing the second type of operation in accordance with the gesture.

2. The device of claim 1, wherein the first kind of gesture is a single contact swipe gesture.

3. The device of claim 1, wherein the dynamic disambiguation threshold is a gesture speed threshold.

4. The device of claim 1, wherein:
a second portion of the gesture is detected after the first portion of the gesture and prior to determining that the gesture is a gesture of the first kind of gesture; and
the second portion of the gesture is used to determine whether the gesture meets the dynamic disambiguation threshold.

5. The device of claim 1, wherein:
the first type of operation is a navigation operation for an electronic document displayed on the display;
the second type of operation is an annotation operation for the electronic document;
the first gesture characteristic is a navigation characteristic; and
in accordance with a determination that the gesture has the first gesture characteristic, the dynamic disambiguation threshold is adjusted to increase the range of values that correspond to the navigation operation.

6. The device of claim 5, wherein:
a user interface that includes a current portion of the electronic document is displayed on the display; and
the navigation operation includes displaying a different portion of the electronic document in the user interface in accordance with the gesture.

7. The device of claim 1, wherein:
the first type of operation is a navigation operation for an electronic document displayed on the display;
the second type of operation is an annotation operation for the electronic document;
the first gesture characteristic is an annotation characteristic; and
in accordance with a determination that the gesture has the first gesture characteristic, the dynamic disambiguation threshold is adjusted to increase the range of values that correspond to the annotation operation.

8. The device of claim 7, wherein:
a user interface that includes at least a portion of the electronic document having predefined content is displayed on the display; and
the annotation operation includes adding additional content to the predefined content.

9. The device of claim 1, wherein:
a user interface that includes at least a portion of an electronic document is displayed on the display; and
determining whether the first portion of the gesture has the first gesture characteristic includes determining whether the first portion of the gesture is detected at a location on the touch-sensitive surface that corresponds to a navigation preferred region of the displayed user interface.

10. The device of claim 9, wherein:
the electronic document includes content; and
the navigation preferred regions are regions that exclude content of the electronic document.

11. The device of claim 9, wherein:
the electronic document includes a plurality of paragraphs of text; and
the navigation preferred regions are regions that are defined in accordance with locations of the plurality of paragraphs in the displayed user interface.

12. The device of claim 9, wherein:
the electronic document includes a plurality of lines of text; and
the navigation preferred regions are regions that are defined in accordance with locations of the plurality of lines of text in the displayed user interface.

13. The device of claim 1, wherein:
a user interface that includes at least a portion of an electronic document is displayed on the display; and
determining whether the first portion of the gesture has a first gesture characteristic includes determining whether the first portion of the gesture is detected at a location on the touch-sensitive surface that corresponds to an annotation preferred region of the displayed user interface.

14. The device of claim 13, wherein:
the electronic document includes a plurality of words having a grammatical structure; and
the annotation preferred regions are regions that are defined in accordance with the grammatical structure of the electronic document.

15. The device of claim 13, wherein:
the electronic document includes a plurality of words; and
the annotation preferred regions are regions that are defined in accordance with locations of the plurality words in the displayed user interface.

16. The device of claim 13, wherein:
the electronic document includes a plurality of terms including one or more emphasized terms; and
the annotation preferred regions are regions that are defined in accordance with locations of the emphasized terms in the displayed user interface.

17. The device of claim 1, wherein determining whether the first portion of the gesture has the first gesture characteristic includes determining whether the first portion of the gesture has a speed that is greater than a predefined speed threshold.

18. The device of claim 1, wherein determining whether the first portion of the gesture has the first gesture characteristic includes determining whether the first portion of the gesture has acceleration that is greater than a predefined acceleration threshold.

19. The device of claim 1, wherein determining whether the first portion of the gesture has a first gesture characteristic includes determining whether the first portion of the gesture includes movement of a contact that matches a predefined movement profile.

20. The device of claim 1, wherein determining whether the first portion of the gesture has the first gesture characteristic includes determining whether the first portion of the gesture has a component of movement in a predefined direction.

21. The device of claim 20, wherein:
the first type of operation is a navigation operation;
the second type of operation is an annotation operation;
a user interface including at least a portion of a document that includes text is displayed on the display;
the predefined direction is a reading direction for the text; and
in accordance with a determination that the first portion of the gesture has a component of movement in the predefined direction, the dynamic disambiguation threshold is adjusted to increase the range of values that correspond to the annotation operation.

22. The device of claim 21, wherein in accordance with a determination that the first portion of the gesture has a component of movement in a direction that is opposite to the predefined direction, the dynamic disambiguation threshold is adjusted to increase the range of values that correspond to the navigation operation.

23. A method, comprising:
at an electronic device having a display and a touch-sensitive surface:
detecting a first portion of a gesture;

determining that the first portion of the gesture has a first gesture characteristic;

in response to determining that the first portion of the gesture has a first gesture characteristic, selecting a dynamic disambiguation threshold in accordance with the first gesture characteristic, wherein the dynamic disambiguation threshold is used to determine whether to perform a first type of operation or a second type of operation when a first kind of gesture is detected;

determining that the gesture is a gesture of the first kind of gesture;

after selecting the dynamic disambiguation threshold, determining whether the gesture meets the dynamic disambiguation threshold;

in accordance with a determination that the gesture meets the dynamic disambiguation threshold, performing the first type of operation in accordance with the gesture; and in accordance with a determination that the gesture does not meet the dynamic disambiguation threshold, performing the second type of operation in accordance with the gesture.

24. A graphical user interface on an electronic device with a display, a touch-sensitive surface, a memory, and one or more processors to execute one or more programs stored in the memory, the graphical user interface comprising:

at least a portion of an electronic document;

wherein:

a first portion of a gesture is detected;

in response to determining that the first portion of the gesture has a first gesture characteristic, a dynamic disambiguation threshold is selected in accordance with the first gesture characteristic, wherein the dynamic disambiguation threshold is used to determine whether to perform a first type of operation or a second type of operation when a first kind of gesture is detected;

the gesture is determined to be a gesture of the first kind of gesture;

after selecting the dynamic disambiguation threshold, whether the gesture meets the dynamic disambiguation threshold is determined;

in accordance with a determination that the gesture meets the dynamic disambiguation threshold, the first type of operation is performed in accordance with the gesture; and in accordance with a determination that the gesture does not meet the dynamic disambiguation threshold, the second type of operation is performed in accordance with the gesture.

25. A non-transitory computer readable storage medium storing one or more programs, the one or more programs comprising instructions, which when executed by an electronic device with a display and a touch-sensitive surface, cause the device to:

detect a first portion of a gesture;

determine that the first portion of the gesture has a first gesture characteristic;

in response to determining that the first portion of the gesture has a first gesture characteristic, select a dynamic disambiguation threshold in accordance with the first gesture characteristic, wherein the dynamic disambiguation threshold is used to determine whether to perform a first type of operation or a second type of operation when a first kind of gesture is detected;

determine that the gesture is a gesture of the first kind of gesture;

after selecting the dynamic disambiguation threshold, determine whether the gesture meets the dynamic disambiguation threshold;

in accordance with a determination that the gesture meets the dynamic disambiguation threshold, perform the first type of operation in accordance with the gesture; and in accordance with a determination that the gesture does not meet the dynamic disambiguation threshold, perform the second type of operation in accordance with the gesture.

* * * * *